US012639579B2

(12) United States Patent
Sarlin et al.

(10) Patent No.: US 12,639,579 B2
(45) **Date of Patent: *May 26, 2026**

(54) SYSTEMS AND METHODS FOR VIRTUAL AND AUGMENTED REALITY

(71) Applicant: Magic Leap, Inc., Plantation, FL (US)

(72) Inventors: Paul-Edouard Sarlin, Zurich (CH); Daniel DeTone, San Francisco, CA (US); Tomasz Jan Malisiewicz, Somerville, MA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,016

(22) Filed: May 24, 2024

(65) Prior Publication Data

US 2024/0311637 A1 Sep. 19, 2024

Related U.S. Application Data

(63) Continuation of application No. 17/098,043, filed on Nov. 13, 2020, now Pat. No. 12,033,081.

(Continued)

(51) Int. Cl.
*G06N 3/084* (2023.01)
*G06F 18/22* (2023.01)
(Continued)

(52) U.S. Cl.
CPC ............. *G06N 3/084* (2013.01); *G06F 18/22* (2023.01); *G06N 3/04* (2013.01); *G06N 3/08* (2013.01);
(Continued)

(58) Field of Classification Search
CPC ............ G06N 3/084; G06N 3/04; G06N 3/08; G06N 3/045; G06N 3/09; G06F 18/22;
(Continued)

(56) References Cited

U.S. PATENT DOCUMENTS 4,344,092 A 8/1982 Miller
4,652,930 A 3/1987 Crawford
(Continued)

FOREIGN PATENT DOCUMENTS

CN 100416340 C 9/2008
CN 101449270 A 6/2009
(Continued)

OTHER PUBLICATIONS

Deep Graphical Feature Learning for the Feature Matching Prolem (Year: 2019).*

(Continued)

*Primary Examiner* — Solomon G Bezuayehu
(74) *Attorney, Agent, or Firm* — Stephen M. De Klerk

(57) ABSTRACT

The description relates the feature matching. Our approach establishes pointwise correspondences between challenging image pairs. It takes off-the-shelf local features as input and uses an attentional graph neural network to solve an assignment optimization problem. The deep middle-end matcher acts as a middle-end and handles partial point visibility and occlusion elegantly, producing a partial assignment matrix.

16 Claims, 8 Drawing Sheets

Related U.S. Application Data

(60) Provisional application No. 62/935,597, filed on Nov. 14, 2019.

(51) Int. Cl.

| | |
|---|---|
| *G06N 3/04* | (2023.01) |
| *G06N 3/08* | (2023.01) |
| *G06V 10/75* | (2022.01) |
| *G06V 10/82* | (2022.01) |
| *G06V 20/00* | (2022.01) |
| *G06V 30/196* | (2022.01) |

(52) U.S. Cl.
CPC ............ *G06V 10/757* (2022.01); *G06V 10/82* (2022.01); *G06V 20/36* (2022.01); *G06V 30/1988* (2022.01)

(58) Field of Classification Search
CPC ...... G06V 10/757; G06V 10/82; G06V 20/36; G06V 30/1988
See application file for complete search history.

(56) References Cited

U.S. PATENT DOCUMENTS

| | | | |
|---|---|---|---|
| 4,810,080 | A | 3/1989 | Grendol et al. |
| 4,997,268 | A | 3/1991 | Dauvergne |
| 5,007,727 | A | 4/1991 | Kahaney et al. |
| 5,074,295 | A | 12/1991 | Willis |
| 5,240,220 | A | 8/1993 | Elberbaum |
| 5,251,635 | A | 10/1993 | Dumoulin et al. |
| 5,410,763 | A | 5/1995 | Bolle |
| 5,455,625 | A | 10/1995 | Englander |
| 5,495,286 | A | 2/1996 | Adair |
| 5,497,463 | A | 3/1996 | Stein et al. |
| 5,659,701 | A | 8/1997 | Amit et al. |
| 5,682,255 | A | 10/1997 | Friesem et al. |
| 5,689,669 | A | 11/1997 | Lynch |
| 5,689,835 | A | 11/1997 | Chao |
| 5,826,092 | A | 10/1998 | Flannery |
| 5,854,872 | A | 12/1998 | Tai |
| 5,864,365 | A | 1/1999 | Sramek et al. |
| 5,937,202 | A | 8/1999 | Crosetto |
| 6,002,853 | A | 12/1999 | de Hond |
| 6,012,811 | A | 1/2000 | Chao et al. |
| 6,016,160 | A | 1/2000 | Coombs et al. |
| 6,064,749 | A | 5/2000 | Hirota et al. |
| 6,076,927 | A | 6/2000 | Owens |
| 6,079,982 | A | 6/2000 | Meader |
| 6,117,923 | A | 9/2000 | Amagai et al. |
| 6,119,147 | A | 9/2000 | Toomey et al. |
| 6,124,977 | A | 9/2000 | Takahashi |
| 6,179,619 | B1 | 1/2001 | Tanaka |
| 6,191,809 | B1 | 2/2001 | Hori et al. |
| 6,219,045 | B1 | 4/2001 | Leahy et al. |
| 6,243,091 | B1 | 6/2001 | Berstis |
| 6,271,843 | B1 | 8/2001 | Lection et al. |
| 6,362,817 | B1 | 3/2002 | Powers et al. |
| 6,375,369 | B1 | 4/2002 | Schneider et al. |
| 6,385,735 | B1 | 5/2002 | Wilson |
| 6,396,522 | B1 | 5/2002 | Vu |
| 6,414,679 | B1 | 7/2002 | Miodonski et al. |
| 6,538,655 | B1 | 3/2003 | Kubota |
| 6,541,736 | B1 | 4/2003 | Huang et al. |
| 6,570,563 | B1 | 5/2003 | Honda |
| 6,573,903 | B2 | 6/2003 | Gantt |
| 6,590,593 | B1 | 7/2003 | Robertson et al. |
| 6,621,508 | B1 | 9/2003 | Shiraishi et al. |
| 6,690,393 | B2 | 2/2004 | Heron et al. |
| 6,757,068 | B2 | 6/2004 | Foxlin |
| 6,784,901 | B1 | 8/2004 | Harvey et al. |
| 6,961,055 | B2 | 11/2005 | Doak |
| 7,046,515 | B1 | 5/2006 | Wyatt |
| 7,051,219 | B2 | 5/2006 | Hwang |
| 7,076,674 | B2 | 7/2006 | Cervantes |
| 7,111,290 | B1 | 9/2006 | Yates, Jr. |
| 7,119,819 | B1 | 10/2006 | Robertson et al. |
| 7,211,986 | B1 | 5/2007 | Flowerdew et al. |
| 7,219,245 | B1 | 5/2007 | Raghuvanshi |
| 7,382,288 | B1 | 6/2008 | Wilson |
| 7,414,629 | B2 | 8/2008 | Santodomingo |
| 7,431,453 | B2 | 10/2008 | Hogan |
| 7,467,356 | B2 | 12/2008 | Gettman et al. |
| 7,542,040 | B2 | 6/2009 | Templeman |
| 7,573,640 | B2 | 8/2009 | Nivon et al. |
| 7,653,877 | B2 | 1/2010 | Matsuda |
| 7,663,625 | B2 | 2/2010 | Chartier et al. |
| 7,724,980 | B1 | 5/2010 | Shenzhi |
| 7,746,343 | B1 | 6/2010 | Charaniya et al. |
| 7,751,662 | B2 | 7/2010 | Kleemann |
| 7,758,185 | B2 | 7/2010 | Lewis |
| 7,788,323 | B2 | 8/2010 | Greenstein et al. |
| 7,804,507 | B2 | 9/2010 | Yang et al. |
| 7,814,429 | B2 | 10/2010 | Buffet et al. |
| 7,817,150 | B2 | 10/2010 | Reichard et al. |
| 7,844,724 | B2 | 11/2010 | Van Wie et al. |
| 8,060,759 | B1 | 11/2011 | Arnan et al. |
| 8,120,851 | B2 | 2/2012 | Iwasa |
| 8,214,660 | B2 | 7/2012 | Capps, Jr. |
| 8,246,408 | B2 | 8/2012 | Elliot |
| 8,353,594 | B2 | 1/2013 | Lewis |
| 8,360,578 | B2 | 1/2013 | Nummela et al. |
| 8,408,696 | B2 | 4/2013 | Hsieh |
| 8,508,676 | B2 | 8/2013 | Silverstein et al. |
| 8,547,638 | B2 | 10/2013 | Levola |
| 8,605,764 | B1 | 12/2013 | Rothaar et al. |
| 8,619,365 | B2 | 12/2013 | Harris et al. |
| 8,696,113 | B2 | 4/2014 | Lewis |
| 8,698,701 | B2 | 4/2014 | Margulis |
| 8,733,927 | B1 | 5/2014 | Lewis |
| 8,736,636 | B2 | 5/2014 | Kang |
| 8,759,929 | B2 | 6/2014 | Shiozawa et al. |
| 8,793,770 | B2 | 7/2014 | Lim |
| 8,823,855 | B2 | 9/2014 | Hwang |
| 8,847,988 | B2 | 9/2014 | Geisner et al. |
| 8,874,673 | B2 | 10/2014 | Kim |
| 9,010,929 | B2 | 4/2015 | Lewis |
| 9,015,501 | B2 | 4/2015 | Gee |
| 9,086,537 | B2 | 7/2015 | Iwasa et al. |
| 9,095,437 | B2 | 8/2015 | Boyden et al. |
| 9,239,473 | B2 | 1/2016 | Lewis |
| 9,244,293 | B2 | 1/2016 | Lewis |
| 9,244,533 | B2 | 1/2016 | Friend et al. |
| 9,285,872 | B1 | 3/2016 | Raffle et al. |
| 9,383,823 | B2 | 7/2016 | Geisner et al. |
| 9,489,027 | B1 | 11/2016 | Ogletree |
| 9,519,305 | B2 | 12/2016 | Wolfe |
| 9,581,820 | B2 | 2/2017 | Robbins |
| 9,582,060 | B2 | 2/2017 | Balatsos |
| 9,658,473 | B2 | 5/2017 | Lewis |
| 9,671,566 | B2 | 6/2017 | Abovitz et al. |
| 9,671,615 | B1 | 6/2017 | Vallius et al. |
| 9,696,795 | B2 | 7/2017 | Marcolina et al. |
| 9,798,144 | B2 | 10/2017 | Sako et al. |
| 9,874,664 | B2 | 1/2018 | Stevens et al. |
| 9,880,441 | B1 | 1/2018 | Osterhout |
| 9,918,058 | B2 | 3/2018 | Takahasi et al. |
| 9,955,862 | B2 | 5/2018 | Freeman et al. |
| 9,978,118 | B1 | 5/2018 | Ozgumer et al. |
| 9,996,797 | B1 | 6/2018 | Holz et al. |
| 10,018,844 | B2 | 7/2018 | Levola et al. |
| 10,082,865 | B1 | 9/2018 | Raynal et al. |
| 10,151,937 | B2 | 12/2018 | Lewis |
| 10,185,147 | B2 | 1/2019 | Lewis |
| 10,218,679 | B1 | 2/2019 | Jawahar |
| 10,241,545 | B1 | 3/2019 | Richards et al. |
| 10,317,680 | B1 | 6/2019 | Richards et al. |
| 10,436,594 | B2 | 10/2019 | Belt et al. |
| 10,516,853 | B1 | 12/2019 | Gibson et al. |
| 10,527,853 | B2 | 1/2020 | Kimmel |
| 10,551,879 | B1 | 2/2020 | Richards et al. |
| 10,578,870 | B2 | 3/2020 | Kimmel |
| 10,646,283 | B2 | 5/2020 | Johnson et al. |
| 10,698,202 | B2 | 6/2020 | Kimmel et al. |

(56) References Cited

U.S. PATENT DOCUMENTS

| | | | |
|---|---|---|---|
| 10,825,424 B2 | 11/2020 | Zhang | |
| 10,856,107 B2 | 12/2020 | Mycek et al. | |
| 10,987,176 B2 | 4/2021 | Poltaretskyi et al. | |
| 11,190,681 B1 | 11/2021 | Brook et al. | |
| 11,199,713 B2 | 12/2021 | Kimmel | |
| 11,209,656 B1 | 12/2021 | Choi et al. | |
| 11,236,993 B1 | 2/2022 | Hall et al. | |
| 11,262,585 B2 | 3/2022 | Potnis et al. | |
| 11,874,468 B2 | 1/2024 | Kimmel | |
| 11,900,626 B2 * | 2/2024 | Tang | G06V 20/64 |
| 2001/0010598 A1 | 8/2001 | Aritake et al. | |
| 2001/0018667 A1 | 8/2001 | Kim | |
| 2002/0007463 A1 | 1/2002 | Fung | |
| 2002/0063913 A1 | 5/2002 | Nakamura et al. | |
| 2002/0071050 A1 | 6/2002 | Homberg | |
| 2002/0095463 A1 | 7/2002 | Matsuda | |
| 2002/0108064 A1 | 8/2002 | Nunally | |
| 2002/0113820 A1 | 8/2002 | Robinson et al. | |
| 2002/0122648 A1 | 9/2002 | Mule' et al. | |
| 2002/0140848 A1 | 10/2002 | Cooper et al. | |
| 2003/0028816 A1 | 2/2003 | Bacon | |
| 2003/0048456 A1 | 3/2003 | Hill | |
| 2003/0067685 A1 | 4/2003 | Niv | |
| 2003/0077458 A1 | 4/2003 | Korenaga et al. | |
| 2003/0080976 A1 | 5/2003 | Satoh et al. | |
| 2003/0115494 A1 | 6/2003 | Cervantes | |
| 2003/0218614 A1 | 11/2003 | Lavelle et al. | |
| 2003/0219992 A1 | 11/2003 | Schaper | |
| 2003/0226047 A1 | 12/2003 | Park | |
| 2004/0001533 A1 | 1/2004 | Tran et al. | |
| 2004/0021600 A1 | 2/2004 | Wittenberg | |
| 2004/0025069 A1 | 2/2004 | Gary et al. | |
| 2004/0042377 A1 | 3/2004 | Nikoloai et al. | |
| 2004/0073822 A1 | 4/2004 | Greco | |
| 2004/0073825 A1 | 4/2004 | Itoh | |
| 2004/0111248 A1 | 6/2004 | Granny et al. | |
| 2004/0113887 A1 | 6/2004 | Pair et al. | |
| 2004/0174496 A1 | 9/2004 | Ji et al. | |
| 2004/0186902 A1 | 9/2004 | Stewart | |
| 2004/0193441 A1 | 9/2004 | Altieri | |
| 2004/0201857 A1 | 10/2004 | Foxlin | |
| 2004/0238732 A1 | 12/2004 | State et al. | |
| 2004/0240072 A1 | 12/2004 | Schindler et al. | |
| 2004/0246391 A1 | 12/2004 | Travis | |
| 2004/0268159 A1 | 12/2004 | Aasheim et al. | |
| 2005/0001977 A1 | 1/2005 | Zelman | |
| 2005/0034002 A1 | 2/2005 | Flautner | |
| 2005/0052621 A1 | 3/2005 | Allen et al. | |
| 2005/0093719 A1 | 5/2005 | Okamoto et al. | |
| 2005/0128212 A1 | 6/2005 | Edecker et al. | |
| 2005/0157159 A1 | 7/2005 | Komiya et al. | |
| 2005/0177385 A1 | 8/2005 | Hull | |
| 2005/0231599 A1 | 10/2005 | Yamasaki | |
| 2005/0273792 A1 | 12/2005 | Inohara et al. | |
| 2006/0013435 A1 | 1/2006 | Rhoads | |
| 2006/0015821 A1 | 1/2006 | Jacques Parker et al. | |
| 2006/0019723 A1 | 1/2006 | Vorenkamp | |
| 2006/0038880 A1 | 2/2006 | Starkweather et al. | |
| 2006/0050224 A1 | 3/2006 | Smith | |
| 2006/0090092 A1 | 4/2006 | Verhulst | |
| 2006/0126181 A1 | 6/2006 | Levola | |
| 2006/0126182 A1 | 6/2006 | Levola | |
| 2006/0129852 A1 | 6/2006 | Bonola | |
| 2006/0132914 A1 | 6/2006 | Weiss et al. | |
| 2006/0179329 A1 | 8/2006 | Terechko | |
| 2006/0221448 A1 | 10/2006 | Nivon et al. | |
| 2006/0228073 A1 | 10/2006 | Mukawa et al. | |
| 2006/0250322 A1 | 11/2006 | Hall et al. | |
| 2006/0259621 A1 | 11/2006 | Ranganathan | |
| 2006/0268220 A1 | 11/2006 | Hogan | |
| 2007/0058248 A1 | 3/2007 | Nguyen et al. | |
| 2007/0103836 A1 | 5/2007 | Oh | |
| 2007/0124730 A1 | 5/2007 | Pytel | |
| 2007/0159673 A1 | 7/2007 | Freeman et al. | |
| 2007/0185398 A1 | 8/2007 | Kimura et al. | |
| 2007/0188837 A1 | 8/2007 | Shimizu et al. | |
| 2007/0198886 A1 | 8/2007 | Saito | |
| 2007/0204672 A1 | 9/2007 | Huang et al. | |
| 2007/0213952 A1 | 9/2007 | Cirelli | |
| 2007/0283247 A1 | 12/2007 | Brenneman et al. | |
| 2008/0002259 A1 | 1/2008 | Ishizawa et al. | |
| 2008/0002260 A1 | 1/2008 | Arrouy et al. | |
| 2008/0030429 A1 | 2/2008 | Hailpern | |
| 2008/0043334 A1 | 2/2008 | Itzkovitch et al. | |
| 2008/0046773 A1 | 2/2008 | Ham | |
| 2008/0050013 A1 | 2/2008 | Munro | |
| 2008/0063802 A1 | 3/2008 | Maula et al. | |
| 2008/0068557 A1 | 3/2008 | Menduni et al. | |
| 2008/0082480 A1 | 4/2008 | Gounares et al. | |
| 2008/0084533 A1 | 4/2008 | Jannard et al. | |
| 2008/0125218 A1 | 5/2008 | Collins | |
| 2008/0146942 A1 | 6/2008 | Dala-Krishna | |
| 2008/0173036 A1 | 7/2008 | Willaims | |
| 2008/0177506 A1 | 7/2008 | Kim | |
| 2008/0183190 A1 | 7/2008 | Adcox et al. | |
| 2008/0205838 A1 | 8/2008 | Crippa et al. | |
| 2008/0215907 A1 | 9/2008 | Wilson | |
| 2008/0225393 A1 | 9/2008 | Rinko | |
| 2008/0235570 A1 | 9/2008 | Sawada et al. | |
| 2008/0246693 A1 | 10/2008 | Hailpern et al. | |
| 2008/0316768 A1 | 12/2008 | Travis | |
| 2009/0076791 A1 | 3/2009 | Rhoades et al. | |
| 2009/0091583 A1 | 4/2009 | McCoy | |
| 2009/0153797 A1 | 6/2009 | Allon et al. | |
| 2009/0177445 A1 | 7/2009 | Capps, Jr. et al. | |
| 2009/0224416 A1 | 9/2009 | Laakkonen et al. | |
| 2009/0245730 A1 | 10/2009 | Kleemann | |
| 2009/0287728 A1 | 11/2009 | Martine et al. | |
| 2009/0300528 A1 | 12/2009 | Stambaugh | |
| 2009/0310633 A1 | 12/2009 | Ikegami | |
| 2010/0005326 A1 | 1/2010 | Archer | |
| 2010/0019962 A1 | 1/2010 | Fujita | |
| 2010/0056274 A1 | 3/2010 | Uusitalo et al. | |
| 2010/0060970 A1 | 3/2010 | Harris et al. | |
| 2010/0063854 A1 | 3/2010 | Purvis et al. | |
| 2010/0070378 A1 | 3/2010 | Trotman et al. | |
| 2010/0079841 A1 | 4/2010 | Levola | |
| 2010/0115428 A1 | 5/2010 | Shuping et al. | |
| 2010/0153934 A1 | 6/2010 | Lachner | |
| 2010/0194632 A1 | 8/2010 | Raento et al. | |
| 2010/0205541 A1 | 8/2010 | Rappaport et al. | |
| 2010/0214284 A1 | 8/2010 | Rieffel et al. | |
| 2010/0232016 A1 | 9/2010 | Landa et al. | |
| 2010/0232031 A1 | 9/2010 | Batchko et al. | |
| 2010/0244168 A1 | 9/2010 | Shiozawa et al. | |
| 2010/0274567 A1 | 10/2010 | Carlson et al. | |
| 2010/0274627 A1 | 10/2010 | Carlson | |
| 2010/0277803 A1 | 11/2010 | Pockett et al. | |
| 2010/0284085 A1 | 11/2010 | Laakkonen | |
| 2010/0287485 A1 | 11/2010 | Bertolami et al. | |
| 2010/0296163 A1 | 11/2010 | Sarikko | |
| 2010/0306715 A1 | 12/2010 | Geisner et al. | |
| 2010/0309687 A1 | 12/2010 | Sampsell et al. | |
| 2010/0321781 A1 | 12/2010 | Levola | |
| 2011/0010636 A1 | 1/2011 | Hamilton, II et al. | |
| 2011/0021263 A1 | 1/2011 | Anderson et al. | |
| 2011/0022870 A1 | 1/2011 | Mcgrane | |
| 2011/0041083 A1 | 2/2011 | Gabai et al. | |
| 2011/0050640 A1 | 3/2011 | Lundback et al. | |
| 2011/0050655 A1 | 3/2011 | Mukawa | |
| 2011/0064268 A1 | 3/2011 | Cobb et al. | |
| 2011/0122240 A1 | 5/2011 | Becker | |
| 2011/0145617 A1 | 6/2011 | Thomson et al. | |
| 2011/0170801 A1 | 7/2011 | Lu et al. | |
| 2011/0182515 A1 | 7/2011 | Iwai et al. | |
| 2011/0218733 A1 | 9/2011 | Hamza et al. | |
| 2011/0286735 A1 | 11/2011 | Temblay | |
| 2011/0291969 A1 | 12/2011 | Rashid et al. | |
| 2011/0317233 A1 | 12/2011 | Hayashibe et al. | |
| 2012/0011389 A1 | 1/2012 | Driesen | |
| 2012/0050535 A1 | 3/2012 | Densham et al. | |
| 2012/0075501 A1 | 3/2012 | Oyagi et al. | |
| 2012/0079466 A1 | 3/2012 | Gonion | |
| 2012/0081392 A1 | 4/2012 | Arthur | |

(56) References Cited

U.S. PATENT DOCUMENTS

| | | |
|---|---|---|
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0215094 A1 | 8/2012 | Rahimian et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0280348 A1 | 11/2012 | Chou et al. |
| 2012/0307075 A1 | 12/2012 | Margalit |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0308861 A1* | 11/2013 | Cordara ............... G06V 10/757 |
| | | 382/170 |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0002329 A1 | 1/2014 | Nishimaki et al. |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0123015 A1 | 5/2014 | Sako et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0204438 A1 | 7/2014 | Yamada et al. |
| 2014/0244983 A1 | 8/2014 | McDonald et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0292645 A1 | 10/2014 | Tsurumi et al. |
| 2014/0313228 A1 | 10/2014 | Kasahara |
| 2014/0340498 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0015842 A1 | 1/2015 | Chen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vazquez, II et al. |
| 2015/0132003 A1 | 5/2015 | Greiner et al. |
| 2015/0132596 A1 | 5/2015 | Yamada et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0051217 A1 | 2/2016 | Douglas et al. |
| 2016/0073069 A1 | 3/2016 | Xue |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0103326 A1 | 4/2016 | Kimura et al. |
| 2016/0123745 A1 | 5/2016 | Cotier et al. |
| 2016/0139402 A1 | 5/2016 | Lapstun |
| 2016/0139411 A1 | 5/2016 | Kang et al. |
| 2016/0155273 A1 | 6/2016 | Lyren et al. |
| 2016/0163063 A1 | 6/2016 | Ashman |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0277645 A1* | 9/2016 | Bitouk ................... G06T 7/246 |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0068020 A1 | 3/2017 | Batchko et al. |
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0118452 A1 | 4/2017 | Ogi et al. |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0172409 A1 | 6/2017 | Cavin et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0214893 A1 | 7/2017 | Naftali et al. |
| 2017/0214907 A1 | 7/2017 | Lapstun |
| 2017/0219841 A1 | 8/2017 | Popovich et al. |
| 2017/0220119 A1 | 8/2017 | Potts et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |

(56)  References Cited

U.S. PATENT DOCUMENTS

| | | |
|---|---|---|
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0246070 A1 | 8/2017 | Osterhout et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Lin et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0336867 A1 | 11/2017 | Wilairat et al. |
| 2017/0357332 A1 | 12/2017 | Balan et al. |
| 2017/0363871 A1 | 12/2017 | Vallius |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0039673 A1 | 2/2018 | Chen et al. |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0056305 A1 | 3/2018 | Sankey et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0084245 A1 | 3/2018 | Lapstun |
| 2018/0088185 A1 | 3/2018 | Woods et al. |
| 2018/0101214 A1 | 4/2018 | Mahindru et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirler et al. |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0196084 A1 | 7/2018 | Tustaniwskyj |
| 2018/0217395 A1 | 8/2018 | LIn et al. |
| 2018/0218545 A1 | 8/2018 | Garcia et al. |
| 2018/0250589 A1 | 9/2018 | Cossairt et al. |
| 2018/0260218 A1 | 9/2018 | Gopal |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0107723 A1 | 4/2019 | Lee et al. |
| 2019/0137788 A1 | 5/2019 | Suen |
| 2019/0155034 A1 | 5/2019 | Singer et al. |
| 2019/0155439 A1 | 5/2019 | Mukherjee et al. |
| 2019/0158926 A1 | 5/2019 | Kang et al. |
| 2019/0162950 A1 | 5/2019 | Lapstun |
| 2019/0167095 A1 | 6/2019 | Krueger |
| 2019/0171909 A1* | 6/2019 | Mandal ................... G06T 7/246 |

| | | |
|---|---|---|
| 2019/0172216 A1 | 6/2019 | Ninan et al. |
| 2019/0178654 A1 | 6/2019 | Hare |
| 2019/0179654 A1 | 6/2019 | Hare |
| 2019/0182415 A1 | 6/2019 | Sivan |
| 2019/0196690 A1 | 6/2019 | Chong et al. |
| 2019/0206116 A1 | 7/2019 | Xu et al. |
| 2019/0219815 A1 | 7/2019 | Price et al. |
| 2019/0243123 A1 | 8/2019 | Bohn |
| 2019/0287270 A1 | 9/2019 | Nakamura et al. |
| 2019/0307510 A1 | 10/2019 | Rotenberg et al. |
| 2019/0318502 A1 | 10/2019 | He et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2019/0388182 A1 | 12/2019 | Kumar et al. |
| 2020/0066045 A1 | 2/2020 | Stahl et al. |
| 2020/0098188 A1 | 3/2020 | Bar-Zeev et al. |
| 2020/0100057 A1 | 3/2020 | Galon et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184653 A1 | 6/2020 | Faulker |
| 2020/0202759 A1 | 6/2020 | Ukai et al. |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0124901 A1 | 4/2021 | Liu et al. |
| 2021/0132380 A1 | 5/2021 | Wieczorek |
| 2021/0141225 A1 | 5/2021 | Meynen et al. |
| 2021/0142582 A1 | 5/2021 | Jones et al. |
| 2021/0150264 A1* | 5/2021 | Karanam ................ G06T 15/10 |
| 2021/0158023 A1 | 5/2021 | Fu et al. |
| 2021/0158627 A1 | 5/2021 | Cossairt et al. |
| 2021/0173480 A1 | 6/2021 | Osterhout et al. |
| 2021/0319236 A1* | 10/2021 | Tang ..................... G05D 1/243 |
| 2021/0333551 A1 | 10/2021 | Schultz |
| 2022/0366598 A1 | 11/2022 | Azimi et al. |
| 2023/0351808 A1 | 11/2023 | Jarvenpaa |
| 2023/0384593 A1 | 11/2023 | Ofir |
| 2024/0103212 A1 | 3/2024 | Jarvenpaa |
| 2025/0039342 A1 | 1/2025 | Traczyk et al. |
| 2025/0189802 A1 | 6/2025 | Ofir |

FOREIGN PATENT DOCUMENTS

| | | |
|---|---|---|
| CN | 102448566 A | 5/2012 |
| CN | 103460255 A | 12/2013 |
| CN | 104040410 A | 9/2014 |
| CN | 104603675 A | 5/2015 |
| CN | 105938426 A | 9/2016 |
| CN | 106662754 A | 5/2017 |
| CN | 107004303 A | 8/2017 |
| CN | 107683497 A1 | 2/2018 |
| CN | 109223121 A | 1/2019 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 13451682 A2 | 2/2003 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 2818910 A1 | 12/2014 |

(56) References Cited

FOREIGN PATENT DOCUMENTS

| | | | |
|---|---|---|---|
| EP | 1237067 | B1 | 1/2016 |
| EP | 3139245 | A1 | 3/2017 |
| EP | 3164776 | B1 | 5/2017 |
| EP | 3236211 | A1 | 10/2017 |
| EP | 2723240 | B1 | 8/2018 |
| EP | 2896986 | B1 | 2/2021 |
| GB | 2499635 | A | 8/2013 |
| GB | 2542853 | A | 4/2017 |
| IN | 938/DEL/2004 | A | 6/2006 |
| JP | H03-036974 | U | 4/1991 |
| JP | 09-121370 | A | 5/1997 |
| JP | H10-333094 | A | 12/1998 |
| JP | 2002-015222 | A | 1/2002 |
| JP | 2002-529806 | | 9/2002 |
| JP | 2003-029198 | A | 1/2003 |
| JP | 2003-141574 | A | 5/2003 |
| JP | 2003-228027 | A | 8/2003 |
| JP | 2003-329873 | A | 11/2003 |
| JP | 2004-348169 | A | 12/2004 |
| JP | 2005-151224 | A | 6/2005 |
| JP | 2005-303843 | A | 10/2005 |
| JP | 2007-012530 | A | 1/2007 |
| JP | 2007-86696 | A | 4/2007 |
| JP | 2007-273733 | A | 10/2007 |
| JP | 2008-257127 | A | 10/2008 |
| JP | 2009-090689 | A | 4/2009 |
| JP | 2009-244869 | A | 10/2009 |
| JP | 2010-014443 | A | 1/2010 |
| JP | 2010-139575 | | 6/2010 |
| JP | 2010-146030 | A | 7/2010 |
| JP | 2010-526341 | A | 7/2010 |
| JP | 2010-271526 | A | 12/2010 |
| JP | 2011-033993 | A | 2/2011 |
| JP | 2011-504522 | A | 2/2011 |
| JP | 2011-257203 | A | 12/2011 |
| JP | 2011-530131 | A | 12/2011 |
| JP | 2012-8356 | A | 1/2012 |
| JP | 2012-015774 | A | 1/2012 |
| JP | 2012-15774 | A | 1/2012 |
| JP | 2012-088777 | A | 5/2012 |
| JP | 2012-235036 | A | 11/2012 |
| JP | 2013-525872 | A1 | 6/2013 |
| JP | 2013-206322 | A | 10/2013 |
| JP | 2013-250045 | A | 12/2013 |
| JP | 2014-500522 | A | 1/2014 |
| JP | 2014-90386 | A | 5/2014 |
| JP | 2014-174366 | A | 9/2014 |
| JP | 2014-524229 | A | 9/2014 |
| JP | 2014-192550 | A | 10/2014 |
| JP | 2015-156512 | A | 8/2015 |
| JP | 2015-191032 | A | 11/2015 |
| JP | 2016-502120 | A | 1/2016 |
| JP | 2016-85463 | A | 5/2016 |
| JP | 2016-516227 | A | 6/2016 |
| JP | 2016-126134 | A | 7/2016 |
| JP | 2017-015697 | A | 1/2017 |
| JP | 2014-068465 | A | 4/2017 |
| JP | 2017-108444 | A | 6/2017 |
| JP | 2017-153498 | | 9/2017 |
| JP | 2017-531840 | A | 10/2017 |
| JP | 2017-535825 | A | 11/2017 |
| JP | 6232763 | B2 | 11/2017 |
| JP | 2018-014579 | A | 1/2018 |
| JP | 2018-503165 | A | 2/2018 |
| JP | 6333965 | B2 | 5/2018 |
| JP | 2018-173739 | A | 11/2018 |
| JP | 2019-177134 | A | 10/2019 |
| JP | 7344896 | B2 | 9/2023 |
| KR | 2005-0010775 | A | 1/2005 |
| KR | 10-2006-0059992 | A | 6/2006 |
| KR | 10-2011-0006408 | | 1/2011 |
| KR | 10-1372623 | B1 | 3/2014 |
| KR | 10-2017-0017243 | | 2/2017 |
| TW | 201219829 | A | 5/2012 |
| TW | 201803289 | A | 1/2018 |
| WO | 1991/000565 | A2 | 1/1991 |
| WO | 2000/030368 | A1 | 6/2000 |
| WO | 2002/071315 | A2 | 9/2002 |
| WO | 2004095248 | A | 11/2004 |
| WO | 2006132614 | A1 | 12/2006 |
| WO | 2007041678 | A2 | 4/2007 |
| WO | 2007/037089 | A1 | 5/2007 |
| WO | 2007/085682 | A1 | 8/2007 |
| WO | 2007/102144 | A1 | 9/2007 |
| WO | 2008137299 | A1 | 11/2008 |
| WO | 2008148927 | A1 | 12/2008 |
| WO | 2009060125 | A1 | 5/2009 |
| WO | 2009/101238 | A1 | 8/2009 |
| WO | 2010015807 | A1 | 2/2010 |
| WO | 2014203440 | A1 | 12/2010 |
| WO | 2012030787 | A2 | 3/2012 |
| WO | 2013/049012 | A1 | 4/2013 |
| WO | 2013062701 | A1 | 5/2013 |
| WO | 2013/145536 | A1 | 10/2013 |
| WO | 2014033306 | A1 | 3/2014 |
| WO | 2015/079610 | A1 | 6/2015 |
| WO | 2015143641 | A1 | 10/2015 |
| WO | 2015194597 | A1 | 12/2015 |
| WO | 2016054092 | A1 | 4/2016 |
| WO | 2017004695 | A1 | 1/2017 |
| WO | 2017044761 | A1 | 3/2017 |
| WO | 2017049163 | A1 | 3/2017 |
| WO | 2017051595 | A1 | 3/2017 |
| WO | 2017120475 | A1 | 7/2017 |
| WO | 2017176861 | A1 | 10/2017 |
| WO | 2017203201 | A1 | 11/2017 |
| WO | 2018008232 | A1 | 1/2018 |
| WO | 2018/031261 | A1 | 2/2018 |
| WO | 2018022523 | A1 | 2/2018 |
| WO | 2018/044537 | A1 | 3/2018 |
| WO | 2018039273 | A1 | 3/2018 |
| WO | 2018057564 | A1 | 3/2018 |
| WO | 2018085287 | A1 | 5/2018 |
| WO | 2018087408 | A1 | 5/2018 |
| WO | 2018097831 | A1 | 5/2018 |
| WO | 2018166921 | A1 | 9/2018 |
| WO | 2018236587 | A1 | 12/2018 |
| WO | 2019040493 | A1 | 2/2019 |
| WO | 2016075689 | A1 | 5/2019 |
| WO | 2019148154 | A1 | 8/2019 |
| WO | 2020010226 | A1 | 1/2020 |

OTHER PUBLICATIONS

"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
"Communication according to Rule 164(1) EPC mailed on Feb. 23, 2022", European Patent Application No. 20753144.3, (11 pages).
"Communication Pursuant to Article 94(3) EPC mailed on Sep. 4, 2019", European Patent Application No. 10793707.0, (4 pages).
"Communication Pursuant to Article 94(3) EPC mailed on Apr. 25, 2022", European Patent Application No. 18885707.2, (5 pages).
"Communication Pursuant to Article 94(3) EPC mailed on Feb. 21, 2024", European Patent Application No. 20770244.0, (8 pages).
"Communication Pursuant to Article 94(3) EPC mailed on Feb. 28, 2023", European Patent Application No. 19845418.3, (6 Pages).
"Communication Pursuant to Article 94(3) EPC mailed on Jan. 4, 2022", European Patent Application No. 20154070.5, (8 pages).
"Communication Pursuant to Article 94(3) EPC mailed on Jul. 28, 2023", European Patent Application No. 19843487.0, (15 pages).
"Communication Pursuant to Article 94(3) EPC mailed on Mar. 11, 2024", European Patent Application No. 20798769.4, (12 pages).
"Communication Pursuant to Article 94(3) EPC mailed on May 23, 2023", European Patent Application No. 18890390.0, (5 pages).
"Communication Pursuant to Article 94(3) EPC mailed on May 30, 2022", European Patent Application No. 19768418.6, (6 pages).
"Communication Pursuant to Article 94(3) EPC mailed on Oct. 21, 2021", European Patent Application No. 16207441.3, (4 pages).
"Communication Pursuant to Article 94(3) EPC mailed on Oct. 6, 2023", European Patent Application No. 19851373.1, (6 pages).

(56) References Cited

OTHER PUBLICATIONS

"Communication Pursuant to Rule 164(1) EPC mailed on Jul. 27, 2021", European Patent Application No. 19833664.6, (11 pages).
"Decision of Rejection mailed on Jan. 5, 2023 with English translation", Chinese Patent Application No. 201880079474.6, (10 pages).
"European Search Report mailed on Oct. 15, 2020", European Patent Application No. 20180623.9, (10 pages).
"Extended European Search Report issued on Jan. 8, 2024", European Patent Application No. 23195266.4, (8 pages).
"Extended European Search Report issued on Apr. 5, 2023", European Patent Application No. 20888716.6, (11 pages).
"Extended European Search Report issued on Dec. 14, 2022", European Patent Application No. 20886547.7, (8 pages).
"Extended European Search Report issued on Jul. 20, 2022", European Patent Application No. 19885958.9, (9 pages).
"Extended European Search Report issued on May 20, 2020", European Patent Application No. 20154070.5, (7 pages).
"Extended European Search Report issued on Jan. 22, 2021", European Patent Application No. 18890390.0, (11 pages).
"Extended European Search Report issued on Apr. 25, 2024", European Patent Application No. 23208907.8, (9 pages).
"Extended European Search Report issued on Nov. 3, 2020", European Patent Application No. 18885707.2, (7 pages).
"Extended European Search Report issued on Jun. 30, 2021", European Patent Application No. 19811971.1, (9 pages).
"Extended European Search Report issued on Mar. 4, 2021", European Patent Application No. 19768418.6, (9 pages).
"Extended European Search Report issued on Nov. 4, 2020", European Patent Application No. 20190980.1, (14 pages).
"Extended European Search Report issued on Aug. 24, 2022", European Patent Application No. 20846338.0, (13 pages).
"Extended European Search Report issued on Aug. 8, 2022", European Patent Application No. 19898874.3, (8 pages).
"Extended European Search Report issued on Sep. 8, 2022", European Patent Application No. 20798769.4, (13 pages).
"Extended European Search Report mailed on Nov. 3, 2022", European Patent Application No. 20770244.0, (23 pages).
"Extended European Search Report mailed on Jun. 12, 2017", European Patent Application No. 16207441.3, (8 pages).
"Extended European Search Report mailed on Jan. 28, 2022", European Patent Application No. 19815876.8, (9 pages).
"Extended European Search Report mailed on Jan. 4, 2022", European Patent Application No. 19815085.6, (9 pages).
"Extended European Search Report mailed on Jul. 16, 2021", European Patent Application No. 19810142.0, (14 pages).
"Extended European Search Report mailed on Jul. 30, 2021", European Patent Application No. 19839970.1, (7 pages).
"Extended European Search Report mailed on Jun. 19, 2020", European Patent Application No. 20154750.2, (10 pages).
"Extended European Search Report mailed on Mar. 22, 2022", European Patent Application No. 19843487.0, (14 pages).
"Extended European Search Report mailed on May 16, 2022", European Patent Application No. 19871001.4, (9 pages).
"Extended European Search Report mailed on May 30, 2022", European Patent Application No. 20753144.3, (10 pages).
"Extended European Search Report mailed on Oct. 27, 2021", European Patent Application No. 19833664.6, (10 pages).
"Extended European Search Report mailed on Sep. 20, 2021", European Patent Application No. 19851373.1, (8 pages).
"Extended European Search Report mailed on Sep. 28, 2021", European Patent Application No. 19845418.3, (13 pages).
"Final Office Action mailed Oct. 16, 2023", U.S. Appl. No. 17/098,043, (7 pages).
"Final Office Action mailed on Aug. 10, 2020", U.S. Appl. No. 16/225,961, (13 pages).
"Final Office Action mailed on Dec. 1, 2023", U.S. Appl. No. 17/357,795, (18 pages).
"Final Office Action mailed on Dec. 29, 2022", U.S. Appl. No. 17/098,059, (32 pages).

"Final Office Action mailed on Dec. 4, 2019", U.S. Appl. No. 15/564,517, (15 pages).
"Final Office Action mailed on Feb. 19, 2020", U.S. Appl. No. 15/552,897, (17 pages).
"Final Office Action mailed on Feb. 23, 2022", U.S. Appl. No. 16/748,193, (23 pages).
"Final Office Action mailed on Feb. 3, 2022", U.S. Appl. No. 16/864,721, (36 pages).
"Final Office Action mailed on Jul. 13, 2022", U.S. Appl. No. 17/262,991, (18 pages).
"Final Office Action mailed on Jun. 15, 2021", U.S. Appl. No. 16/928,313, (42 pages).
"Final Office Action mailed on Mar. 1, 2021", U.S. Appl. No. 16/214,575, (29 pages).
"Final Office Action mailed on Mar. 10, 2023", U.S. Appl. No. 17/357,795, (15 pages).
"Final Office Action mailed on Mar. 19, 2021", U.S. Appl. No. 16/530,776, (25 pages).
"Final Office Action mailed on Nov. 24, 2020", U.S. Appl. No. 16/435,933, (44 pages).
"Final Office Action mailed on Sep. 17, 2021", U.S. Appl. No. 16/938,782, (44 pages).
"Final Office Action mailed on Sep. 8, 2023 with English translation", Japanese Patent Application No. 2020-566620, (18 pages).
"First Examination Report Mailed on Aug. 8, 2023", Australian Patent Application No. 2018379105, (3 pages).
"First Examination Report Mailed on Dec. 8, 2022", Australian Patent Application No. 2018392482, (3 pages).
"First Examination Report Mailed on Jul. 27, 2022", Chinese Patent Application No. 201980036675.2, (5 pages).
"First Examination Report Mailed on Jul. 28, 2022", Indian Patent Application No. 202047024232, (6 pages).
"First Examination Report Mailed on May 13, 2022", Indian Patent Application No. 202047026359, (8 pages).
"First Office Action mailed Apr. 21, 2023 with English translation", Japanese Patent Application No. 2021-509779, (26 pages).
"First Office Action mailed Dec. 12, 2023 with English translation", Japanese Patent Application No. 2021-545712, (8 pages).
"First Office Action mailed Dec. 20, 2023 with English translation", Chinese Patent Application No. 201980050600.X, (21 pages).
"First Office Action mailed Dec. 27, 2023 with English translation", Chinese Patent Application No. 201980075942.7, (7 pages).
"First Office Action mailed Jul. 4, 2023 with English translation", Japanese Patent Application No. 2021-505669, (6 pages).
"First Office Action mailed Mar. 1, 2024 with English translation", Japanese Patent Application No. 2021-553297, (5 pages).
"First Office Action mailed on Apr. 13, 2023 with English Translation", Japanese Patent Application No. 2020-567766, (7 pages).
"First Office Action mailed on Dec. 11, 2023 with translation", Chinese Patent Application No. 201980032005.3, (17 pages).
"First Office Action mailed on Dec. 22, 2022 with English translation", Chinese Patent Application No. 201980061450.2, (11 pages).
"First Office Action mailed on Dec. 25, 2023 with English translation", Chinese Patent Application No. 2019800046303.8, (13 pages).
"First Office Action mailed on Feb. 11, 2022 with English translation", Chinese Patent Application No. 201880089255.6, (17 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Jun. 13, 2023 with English translation", Japanese Patent Application No. 2020-567853, (7 pages).
"First Office Action mailed on Mar. 14, 2022 with English translation", Chinese Patent Application No. 201880079474.6, (11 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"First Office Action mailed on May 26, 2023 with English translation", Japanese Patent Application No. 2021-500607, (6 pages).
"First Office Action mailed on May 30, 2023", Israeli Patent Application No. 275065, (4 pages).

(56)　　　　　References Cited

OTHER PUBLICATIONS

"First Office Action mailed on May 30, 2023 with English translation", Japanese Patent Application No. 2021-519873, (8 pages).
"First Office Action mailed on Sep. 16, 2022 with English translation", Chinese Patent Application No. 201980063642.7, (7 pages).
"First Office Action mailed Sep. 29, 2023 with English translation", Japanese Patent Application No. 2023-10887, (5 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019] , Apr. 12, 2019 , (98 pages).
"International Search Report and Written Opinion mailed on Feb. 12, 2021", International PCT Application No. PCT/US20/60555, (25 pages).
"International Search Report and Written Opinion mailed on Mar. 12, 2020", International PCT Patent Application No. PCT/US19/67919, (14 pages).
"International Search Report and Written Opinion mailed on Aug. 15, 2019", International PCT Patent Application No. PCT/US19/33987, (20 pages).
"International Search Report and Written Opinion mailed on Jun. 15, 2020", International PCT Patent Application No. PCT/US2020/017023, (13 pages).
"International Search Report and Written Opinion mailed on Oct. 16, 2019", International PCT Patent Application No. PCT/US19/43097, (10 pages).
"International Search Report and Written Opinion mailed on Oct. 16, 2019", International PCT Patent Application No. PCT/US19/36275, (10 pages).
"International Search Report and Written Opinion mailed on Oct. 16, 2019", International PCT Patent Application No. PCT/US19/43099, (9 pages).
"International Search Report and Written Opinion mailed on Jun. 17, 2016", International PCT Patent Application No. PCT/FI2016/050172, (9 pages).
"International Search Report and Written Opinion mailed on Feb. 2, 2021", International PCT Patent Application No. PCT/US20/60550, (9 pages).
"International Search Report and Written Opinion mailed on Oct. 22, 2019", International PCT Patent Application No. PCT/US19/43751, (9 pages).
"International Search Report and Written Opinion mailed on Dec. 23, 2019", International PCT Patent Application No. PCT/US19/44953, (11 pages).
"International Search Report and Written Opinion mailed on May 23, 2019", International PCT Patent Application No. PCT/US18/66514, (17 pages).
"International Search Report and Written Opinion mailed on Sep. 26, 2019", International PCT Patent Application No. PCT/US19/40544, (12 pages).
"International Search Report and Written Opinion mailed on Aug. 27, 2019", International PCT Application No. PCT/US2019/035245, (8 pages).
"International Search Report and Written Opinion mailed on Dec. 27, 2019", International PCT Application No. PCT/US19/47746, (16 pages).
"International Search Report and Written Opinion mailed on Dec. 3, 2020", International PCT Patent Application No. PCT/US20/43596, (25 pages).
"International Search Report and Written Opinion mailed on Sep. 30, 2019", International PCT Patent Application No. PCT/US19/40324, (7 pages).
"International Search Report and Written Opinion mailed on Sep. 4, 2020", International PCT Patent Application No. PCT/US20/31036, (13 pages).
"International Search Report and Written Opinion mailed on Jun. 5, 2020", International PCT Patent Application No. PCT/US20/19871, (9 pages).
"International Search Report and Written Opinion mailed on Aug. 8, 2019", International PCT Patent Application No. PCT/US2019/034763, (8 pages).
"International Search Report and Written Opinion mailed on Oct. 8, 2019", International PCT Patent Application No. PCT/US19/41151, (7 pages).
"International Search Report and Written Opinion mailed on Jan. 9, 2020", International PCT Application No. PCT/US19/55185, (10 pages).
"International Search Report and Written Opinion mailed on Feb. 28, 2019", International PCT Patent Application No. PCT/US18/64686, (8 pages).
"International Search Report and Written Opinion mailed on Feb. 7, 2020", International PCT Patent Application No. PCT/US2019/061265, (11 pages).
"International Search Report and Written Opinion mailed on Jun. 11, 2019", International PCT Application No. PCT/US19/22620, (7 pages).
"Invitation to Pay Additional Fees mailed Aug. 15, 2019", International PCT Patent Application No. PCT/US19/36275, (2 pages).
"Invitation to Pay Additional Fees mailed Sep. 24, 2020", International PCT Patent Application No. PCT/US2020/043596, (3 pages).
"Invitation to Pay Additional Fees mailed on Oct. 22, 2019", International PCT Patent Application No. PCT/US19/47746, (2 pages).
"Invitation to Pay Additional Fees mailed on Apr. 3, 2020", International PCT Patent Application No. PCT/US20/17023, (2 pages).
"Invitation to Pay Additional Fees mailed on Oct. 17, 2019", International PCT Patent Application No. PCT/US19/44953, (2 pages).
"Multi-core processor", TechTarget , 2013 , (1 page).
"Non Final Office Action mailed Nov. 19. 2019", U.S. Appl. No. 16/355,611, (31 pages).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Apr. 13, 2023", U.S. Appl. No. 17/098,043, (7 pages).
"Non Final Office Action mailed on Aug. 2, 2023", U.S. Appl. No. 17/807,600, (25 pages).
"Non Final Office Action mailed on Aug. 21, 2019", U.S. Appl. No. 15/564,517, (14 pages).
"Non Final Office Action mailed on Aug. 4, 2021", U.S. Appl. No. 16/864,721, (21 pages).
"Non Final Office Action mailed on Dec. 7, 2022", U.S. Appl. No. 17/357,795, (63 pages).
"Non Final Office Action mailed on Feb. 2, 2022", U.S. Appl. No. 16/783,866, (8 pages).
"Non Final Office Action mailed on Feb. 26, 2024", U.S. Appl. No. 18/046,739, (48 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Jan. 26, 2021", U.S. Appl. No. 16/928,313, (33 pages).
"Non Final Office Action mailed on Jan. 27, 2021", U.S. Appl. No. 16/225,961, (15 pages).
"Non Final Office Action mailed on Jul. 20, 2023", U.S. Appl. No. 17/650,188, (11 pages).
"Non Final Office Action mailed on Jul. 26, 2022", U.S. Appl. No. 17/098,059, (28 pages).
"Non Final Office Action mailed on Jul. 27, 2020", U.S. Appl. No. 16/435,933, (16 pages).
"Non Final Office Action mailed on Jul. 9, 2021", U.S. Appl. No. 17/002,663, (43 pages).
"Non Final Office Action mailed on Jul. 9, 2021", U.S. Appl. No. 16/833,093, (47 pages).

(56) References Cited

OTHER PUBLICATIONS

"Non Final Office Action mailed on Jun. 10, 2021", U.S. Appl. No. 16/938,782, (40 Pages).

"Non Final Office Action mailed on Jun. 14, 2023", U.S. Appl. No. 17/516,483, (10 pages).

"Non Final Office Action mailed on Jun. 17, 2020", U.S. Appl. No. 16/682,911, (22 pages).

"Non Final Office Action mailed on Jun. 19, 2020", U.S. Appl. No. 16/225,961, (35 pages).

"Non Final Office Action mailed on Jun. 29, 2021", U.S. Appl. No. 16/698,588, (58 pages).

"Non Final Office Action mailed on Mar. 1, 2023", U.S. Appl. No. 18/046,739, (34 pages).

"Non Final Office Action mailed on Mar. 3, 2021", U.S. Appl. No. 16/427,337, (41 pages).

"Non Final Office Action mailed on Mar. 31, 2022", U.S. Appl. No. 17/257,814, (60 pages).

"Non Final Office Action mailed on Mar. 9, 2022", U.S. Appl. No. 16/870,676, (57 pages).

"Non Final Office Action mailed on May 10, 2022", U.S. Appl. No. 17/140,921, (25 pages).

"Non Final Office Action mailed on May 11, 2023", U.S. Appl. No. 17/822,279, (24 pages).

"Non Final Office Action mailed on May 16, 2024", U.S. Appl. No. 18/361,546, (11 pages).

"Non Final Office Action mailed on May 17, 2022", U.S. Appl. No. 16/748,193, (11 pages).

"Non Final Office Action mailed on May 26, 2021", U.S. Appl. No. 16/214,575, (19 pages).

"Non Final Office Action mailed on Nov. 19, 2019", U.S. Appl. No. 16/355,611, (31 pages).

"Non Final Office Action mailed on Nov. 22, 2023", U.S. Appl. No. 17/268,376, (8 pages).

"Non Final Office Action mailed on Nov. 3, 2023", U.S. Appl. No. 17/416,248, (17 pages).

"Non Final Office Action mailed on Nov. 5, 2020", U.S. Appl. No. 16/530,776, (45 pages).

"Non Final Office Action mailed on Oct. 11, 2023", U.S. Appl. No. 17/357,795, (14 pages).

"Non Final Office Action mailed on Oct. 22, 2019", U.S. Appl. No. 15/859,277, (15 pages).

"Non Final Office Action mailed on Oct. 24, 2023", U.S. Appl. No. 17/259,020, (21 pages).

"Non Final Office Action mailed on Sep. 1, 2020", U.S. Appl. No. 16/214,575, (40 pages).

"Non Final Office Action mailed on Sep. 19, 2022", U.S. Appl. No. 17/263,001, (14 pages).

"Non Final Office Action mailed on Sep. 20, 2021", U.S. Appl. No. 17/105,848, (56 pages).

"Non Final Office Action mailed on Sep. 29, 2021", U.S. Appl. No. 16/748,193, (62 pages).

"Notice of Allowance mailed on Jul. 27, 2023 with English translation", Korean Patent Application No. 10-2020-7019685, (4 pages).

"Notice of Allowance mailed on Mar. 25, 2020", U.S. Appl. No. 15/564,517, (11 pages).

"Notice of Allowance mailed on Oct. 5, 2020", U.S. Appl. No. 16/682,911, (27 pages).

"Notice of Reason for Rejection mailed on Oct. 28, 2022 with English translation", Japanese Patent Application No. 2020-531452, (3 pages).

"Notice of Reason of Refusal mailed on Sep. 11, 2020 with English translation", Japanese Patent Application No. 2019-140435, (6 pages).

"Office Action mailed May 31, 2023", Israeli Patent Application No. 275373, (5 pages).

"Office Action mailed Nov. 21, 2023 with English Translation", Japanese Patent Application No. 2021-535716, (15 pages).

"Office Action mailed on Apr. 13, 2023 with English translation", Japanese Patent Application No. 2020-533730, (13 pages).

"Office Action mailed on Dec. 14, 2023 with English translation", Japanese Patent Application No. 2021-526564, (13 pages).

"Office Action mailed on Feb. 19, 2024 with English translation", Korean Patent Application No. 10-2020-7020552, (18 pages).

"Office Action mailed on Feb. 26, 2024 with English translation", Chinese Patent Application No. 201980069194.1, (11 pages).

"Office Action mailed on Jul. 20, 2023 with English translation", Japanese Patent Application No. 2021-505884, (6 pages).

"Office Action mailed on Jun. 8, 2023 with English translation", Japanese Patent Application No. 2021-503762, (6 pages).

"Office Action mailed on Mar. 30, 2023 with English translation", Japanese Patent Application No. 2020-566620, (10 pages).

"Office Action mailed on Mar. 6, 2024 with English translation", Chinese Patent Application No. 201980053016.X, (7 pages).

"Office Action mailed on Nov. 24, 2022 with English Translation", Japanese Patent Application No. 2020-533730, (11 pages).

"Office Action mailed on Nov. 7, 2023 with English translation", Korean Patent Application No. 10-2023-7036734, (5 pages).

"Office Action mailed on Nov. 8, 2023 with English translation", Chinese Patent Application No. 201980060018.1, (12 pages).

"Penultimate Office Action mailed on Oct. 19, 2023 with English translation", Japanese Patent Application No. 2021-509779, (5 pages).

"Phototourism Challenge", CVPR 2019 Image Matching Workshop. https://image matching-workshop. github.io., (16 pages).

"Second Office Action mailed on Jul. 13, 2022 with English Translation", Chinese Patent Application No. 201880079474.6, (10 pages).

"Second Office Action mailed on Jun. 20, 2022 with English Translation", Chinese Patent Application No. 201880089255.6, (14 pages).

"Second Office Action mailed on May 2, 2023 with English Translation", Japanese Patent Application No. 2020-549034, (6 pages).

"Second Office Action mailed on Sep. 25, 2023 with English translation", Japanese Patent Application No. 2020-567853, (8 pages).

"Summons to attend oral proceedings pursuant to Rule 115(1) EPC mailed on Jul. 15, 2019", European Patent Application No. 15162521.7, (7 pages).

"Wikipedia Dioptre", Jun. 22, 2018 (Jun. 22, 2018), XP093066995, Retrieved from the Internet: URL:https://en.wikipedia.org/w/index.php? title=Dioptre&direction=next&oldid=846451540 [retrieved on Jul. 25, 2023], (3 pages).

Aarik, J. , et al. , "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351 ?via%3Dihub>; DOI: 10.1016/S0040-6090(97)00135-1; see entire document, (2 pages).

Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract.

Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022].

Arandjelović, Relja , et al. , "Three things everyone should know to improve object retrieval", CVPR, 2012, (8 pages).

Azom, "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx? Article1D=1114>.

Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).

Azuma, Ronald T. , "Predictive Tracking for Augmented Reality", Department of Computer Science, Chapel Hill Nc; TR95-007, Feb. 1995, 262 pages.

(56) References Cited

OTHER PUBLICATIONS

Battaglia, Peter W, et al. , "Relational inductive biases, deep learning, and graph networks", arXiv:1806.01261, Oct. 17, 2018, pp. 1-40.
Berg, Alexander C , et al. , "Shape matching and object recognition using low distortion correspondences", In CVPR, 2005, (8 pages).
Bian, Jiawang , et al. , "GMS: Grid-based motion statistics for fast, ultra-robust feature correspondence.", In CVPR (Conference on Computer Vision and Pattern Recognition), 2017, (10 pages).
Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric , et al. , "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tibério S , et al. , "Learning graph matching", IEEE TPAMI, 31(6):1048-1058, 2009.
Cech, Jan , et al. , "Efficient sequential correspondence selection by cosegmentation", IEEE TPAMI, 32(9):1568-1581, Sep. 2010.
Chittineni, C. , et al. , "Single filters for combined image geometric manipulation and enhancement", Proceedings of SPIE vol. 1903, Image and Video Processing, Apr. 8, 1993, San Jose, CA. (Year: 1993), pp. 111-121.
Cuturi, Marco, "Sinkhorn distances: Lightspeed computation of optimal transport", NIPS, 2013, (9 pages).
Dai, Angela , et al. , "ScanNet: Richly-annotated 3d reconstructions of indoor scenes", In CVPR, arXiv:1702.04405v2 [cs.CV] Apr. 11, 2017, (22 pages).
Deng, Haowen , et al. , "PPFnet: Global context aware local features for robust 3d point matching", In CVPR, arXiv:1802.02669v2 [cs.CV] Mar. 1, 2018, (12 pages).
Detone, Daniel , et al. , "Deep image homography estimation", In RSS Work-shop: Limits and Potentials of Deep Learning in Robotics, arXiv:1606.03798v1 [cs.CV] Jun. 13, 2016, (6 pages).
Detone, Daniel , et al. , "Self-improving visual odometry", arXiv:1812.03245, Dec. 8, 2018, (9 pages).
Detone, Daniel , et al. , "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai , et al. , "D2-net: A trainable CNN for joint detection and description of local features", CVPR, arXiv:1905.03561v1 [cs.CV] May 9, 2019, (16 pages).
Ebel, Patrick , et al. , "Beyond cartesian representations for local descriptors", ICCV, arXiv:1908.05547v1 [cs.CV] Aug. 15, 2019, (11 pages).
Fischler, Martin A , et al. , "Random sample consensus: a paradigm for model fitting with applications to image analysis and automated cartography", Communications of the ACM, 24(6): 1981, pp. 381-395.
Gilmer, Justin , et al. , "Neural message passing for quantum chemistry", In ICML, arXiv:1704.01212v2 [cs.LG] Jun. 12, 2017, (14 pages).
Giuseppe, Donato , et al. , "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States, 69550P.
Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>.

Hartley, Richard , et al. , "Multiple View Geometry in Computer Vision", Cambridge University Press, 2003, pp. 1-673.
Jacob, Robert J.K. , "Eye Tracking in Advanced Interface Design", Human-Computer Interaction Lab, Naval Research Laboratory, Washington, D.C., date unknown. 2003, pp. 1-50.
Lee , et al. , "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Lee, Juho , et al. , "Set transformer: A frame-work for attention-based permutation-invariant neural networks", ICML, arXiv:1810.00825v3 [cs.LG] May 26, 2019, (17 pages).
Leordeanu, Marius , et al. , "A spectral technique for correspondence problems using pairwise constraints", Proceedings of (ICCV) International Conference on Computer Vision, vol. 2, pp. 1482-1489, Oct. 2005, (8 pages).
Levola, T., "Diffractive Optics for Virtual Reality Displays", Journal of the SID Eurodisplay 14/05, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 DIGEST, 2006 SID International Symposium, Society for Information Display, vol. XXXVII, May 24, 2005, chapters 1-3, figures 1 and 3, pp. 64-67.
Li, Yujia , et al. , "Graph Matching Networks for Learning the Similarity of Graph Structured Objects", arxiv.org, Cornell University Library, 201 Olin Library Cornell University Ithaca, NY 14853, XP081268608.
Li, Yujia , et al. , "Graph matching networks for learning the similarity of graph structured objects", ICML, arXiv:1904.12787v2 [cs.LG] May 12, 2019, (18 pages).
Li, Zhengqi , et al. , "Megadepth: Learning single-view depth prediction from internet photos", In CVPR, fromarXiv: 1804.00607v4 [cs.CV] Nov. 28, 2018, (10 pages).
Libovicky , et al. , "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Loiola, Eliane Maria, et al. , "A survey for the quadratic assignment problem", European journal of operational research, 176(2): 2007, pp. 657-690.
Lowe, David G , "Distinctive image features from scale-invariant keypoints", International Journal of Computer Vision, 60(2): 91-110, 2004, (28 pages).
Luo, Zixin , et al. , "ContextDesc: Local descriptor augmentation with cross-modality context", CVPR, arXiv:1904.04084v1 [cs.CV] Apr. 8, 2019, (14 pages).
Luo, Zixin , et al. , "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], pp. 2522-2531.
Memon, F. , et al. , "Synthesis, Characterization and Optical Constants of Silicon Oxycarbide", EPJ Web of Conferences; Publication [online]. Mar. 23, 2017 [retrieved Feb. 19, 2020) .<URL: https://www.epj-conferences.org/articles/epjconf/pdf/2017/08/epjconf_nanop2017 _00002.pdf>; DOI: 10.1051/epjconf/201713900002, (8 pages).
Molchanov, Pavlo , et al. , "Short-range FMCW monopulse radar for hand-gesture sensing", 2015 IEEE Radar Conference (RadarCon) (2015), pp. 1491-1496.
Mrad , et al. , "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki , et al. , "LF-Net: Learning local features from images", 32nd Conference on Neural Information Processing Systems (NIPS 2018), arXiv:1805.09662v2 [cs.CV] Nov. 22, 2018, (13 pages).

(56)          References Cited

OTHER PUBLICATIONS

Paszke, Adam , et al. , "Automatic differentiation in Pytorch", 31st Conference on Neural Information Processing Systems (NIPS 2017), Long Beach, CA, USA, (4 pages).

Peyré, Gabriel , et al. , "Computational Optimal Transport", Foundations and Trends in Machine Learning, 11(5-6):355-607, 2019; arXiv:1803.00567v4 [stat.ML] Mar. 18, 2020, (209 pages).

Qi, Charles Ruizhongtai, et al. , "Pointnet++: Deep hierarchical feature learning on point sets in a metric space.", 31st Conference on Neural Information Processing Systems (NIPS 2017), Long Beach, CA, USA., Jun. 7, 2017, (10 pages).

Qi, Charles R , et al. , "Pointnet: Deep Learning on Point Sets for 3D Classification and Segmentation", CVPR, arXiv:1612.00593v2 [cs.CV] Apr. 10, 2017, (19 pages).

Radenović, Filip , et al. , "Revisiting Oxford and Paris: Large-Scale Image Retrieval Benchmarking", CVPR, arXiv:1803.11285v1 [cs. CV] Mar. 29, 2018, (10 pages).

Raguram, Rahul , et al. , "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).

Ranftl, René , et al. , "Deep fundamental matrix estimation", European Conference on Computer Vision (ECCV), 2018, (17 pages).

Revaud, Jerome , et al. , "R2D2: Repeatable and Reliable Detector and Descriptor", In NeurIPS, arXiv:1906.06195v2 [cs.CV] Jun. 17, 2019, (12 pages).

Rocco, Ignacio , et al. , "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).

Rublee, Ethan , et al. , "ORB: An efficient alternative to SIFT or SURF", Proceedings of the IEEE International Conference on Computer Vision. 2564-2571. 2011; 10.1109/ICCV.2011.612654, (9 pages).

Sarlin , et al. , "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911. 11763 >, entire document.

Sattler, Torsten , et al. , "SCRAMSAC: Improving RANSAC's efficiency with a spatial consistency filter", ICCV, 2009: 2090-2097., (8 pages).

Schonberger, Johannes Lutz, et al. , "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.

Schonberger, Johannes Lutz, et al. , "Structure-from-motion revisited", Proceedings of the IEEE Conference on Computer Vision and Pattern Recognition (CVPR), 2016, pp. 4104-4113, (11 pages).

Sheng, Liu , et al. , "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592, pp. 1642-1644.

Sinkhorn, Richard , et al. , "Concerning nonnegative matrices and doubly stochastic matrices.", Pacific Journal of Mathematics, 1967, pp. 343-348.

Spencer, T. , et al. , "Decomposition of poly(propylene carbonate) with UV sensitive iodonium 11 salts", Polymer Degradation and Stability; (online]. Dec. 24, 2010 (retrieved Feb. 19, 2020]., (17 pages).

Tanriverdi, Vildan , et al. , "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.

Thomee, Bart , et al. , "YFCC100m: The new data in multimedia research", Communications of the ACM, 59(2):64-73, 2016; arXiv:1503. 01817v2 [cs.MM] Apr. 25, 2016, (8 pages).

Torresani, Lorenzo , et al. , "Feature correspondence via graph matching: Models and global optimization", Computer Vision—ECCV 2008, 10th European Conference on Computer Vision, Marseille, France, Oct. 12-18, 2008, Proceedings, Part II, (15 pages).

Tuytelaars, Tinne , et al. , "Wide baseline stereo matching based on local, affinely invariant regions", BMVC, 2000, pp. 1-14.

Ulyanov, Dmitry , et al. , "Instance normalization: The missing ingredient for fast stylization", arXiv:1607.08022v3 [cs.CV] Nov. 6, 2017, (6 pages).

Vaswani, Ashish , et al. , "Attention is all you need", 31st Conference on Neural Information Processing Systems (NIPS 2017), Long Beach, CA, USA; arXiv:1706.03762v5 [cs.CL] Dec. 6, 2017, (15 pages).

Veličković, Petar , et al. , "Graph attention networks", ICLR, arXiv:1710.10903v3 [stat.ML] Feb. 4, 2018, (12 pages).

Villani, Cédric, "Optimal transport: old and new", vol. 338. Springer Science & Business Media, Jun. 2008, pp. 1-998.

Wang, Xiaolong , et al. , "Non-local neural networks", CVPR, arXiv:1711.07971v3 [cs.CV] Apr. 13, 2018, (10 pages).

Wang, Yue , et al. , "Deep Closest Point: Learning representations for point cloud registration", ICCV, arXiv:1905.03304v1 [cs.CV] May 8, 2019, (10 pages).

Wang, Yue , et al. , "Dynamic Graph CNN for learning on point clouds", ACM Transactions on Graphics, arXiv:1801.07829v2 [cs. CV] Jun. 11, 2019, (13 pages).

Weissel , et al. , "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/ 10.1145/581630.581668>.

Yi, Kwang Moo, et al. , "Learning to find good correspondences", CVPR, arXiv:1711.05971v2 [cs.CV] May 21, 2018, (13 pages).

Yi, Kwang Moo , et al. , "Lift: Learned invariant feature transform", ECCV, arXiv:1603.09114v2 [cs.CV] Jul. 29, 2016, (16 pages).

Zaheer, Manzil , et al. , "Deep Sets", 31st Conference on Neural Information Processing Systems (NIPS 2017), Long Beach, CA, USA; arXiv:1703.06114v3 [cs.LG] Apr. 14, 2018, (29 pages).

Zhang, Jiahui , et al. , "Learning two-view correspondences and geometry using order-aware network", ICCV; aarXiv:1908. 04964v1 [cs.CV] Aug. 14, 2019, (11 pages).

Zhang, Li , et al. , "Dual graph convolutional net-work for semantic segmentation", BMVC, 2019; arXiv:1909.06121v3 [cs.CV] Aug. 26, 2020, (18 pages).

Zhang, Zen , et al. , "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], pp. 5086-5095.

"Communication Pursuant to Article 94(3) EPC mailed Nov. 28, 2024", European Patent Application No. 19885958.9, (5 pages).

"Communication Pursuant to Article 94(3) EPC mailed on Feb. 7, 2025", European Patent Application No. 20154070.5, (7 pages).

"Communication Pursuant to Article 94(3) EPC mailed on Mar. 18, 2025", European Patent Application No. 19810142.0, (8 pages).

"Communication Pursuant to Article 94(3) EPC mailed on Nov. 21, 2024", European Patent Application No. 20846338.0, (11 pages).

"Extended European Search Report issued on Dec. 2, 2024", European Patent Application No. 24167829.1, (7 pages).

"Final Office Action mailed on Aug. 15, 2024 with English translation", Japanese Patent Application No. 2021-553297, (5 pages).

"Final Office Action mailed on Dec. 13, 2024 with English translation", Japanese Patent Application No. 2021-564496, (13 pages).

"First Office Action mailed Oct. 17, 2024 with English translation", Japanese Patent Application No. 2022-527990, (24 pages).

"First Office Action with English translation dated Aug. 8, 2024", Chinese Patent Application No. 202080053774.4, (23 pages).

"Non Final Office Action mailed on Apr. 16, 2025", U.S. Appl. No. 18/679,328, (10 pages).

"Non Final Office Action mailed on Jan. 3, 2025", U.S. Appl. No. 18/746,709, (31 pages).

(56) References Cited

OTHER PUBLICATIONS

"Non Final Office Action mailed on Sep. 24, 2024", U.S. Appl. No. 18/597,716, (9 pages).

"Notice of Reasons for Rejection mailed on Dec. 4, 2024 with English tranlsation", Japanese Patent Application No. 2023-118968, (9 pages).

"Office Action mailed Feb. 20, 2025 with English translation", Japanese Patent Application No. 2024-135314, (6 pages).

"Office Action mailed on Apr. 16, 2025 with English Translation", Japanese Patent Application No. 2024-139589, (8 pages).

"Office Action mailed on Apr. 16, 2025 with English Translation", Japanese Patent Application No. 2022-527990, (9 pages).

"Office Action mailed on Jan. 22, 2025 with English translation", Japanese Patent Application No. 2024-63271, (8 pages).

"Office Action mailed on Mar. 17, 2025 with English Translation", Japanese Patent Application No. 2023-221068, (9 pages).

"Office Action mailed on Nov. 7, 2024 with English translation", Korean Patent Application No. 10-2024-7032937, (7 pages).

"Office Action mailed on Oct. 4, 2024 with English translation", Japanese Patent Application No. 2022-527710, (10 pages).

"Penultimate Office Action mailed on Apr. 9, 2024—English translation", Japanese Patent Application No. 2021-535716, (5 pages).

"Penultimate Office Action mailed on Sep. 17, 2024 with English translation", Japanese Patent Application No. 2023-115047, (7 pages).

"Second Office Action with English translation mailed on Mar. 25, 2025", Chinese Patent Application No. 202080053774.4, (11 pages).

"Extended European Search Report issued on Aug. 6, 2024", European Patent Application No. 24184599.9, (14 pages).

"Extended European Search Report issued on Jul. 9, 2024", European Patent Application No. 24166847.4, (8 pages).

"Final Office Action mailed on May 24, 2024", U.S. Appl. No. 18/046,739, (52 pages).

"First Office Action mailed Jun. 20, 2024 with English translation", Japanese Patent Application No. 2021-564496, (14 pages).

"First Office Action mailed Jun. 24, 2024 with English translation", Japanese Patent Application No. 2022-504602, (7 pages).

"First Office Action mailed Mar. 20, 2024 with English translation", Chinese Patent Application No. 202080048293.4, (22 pages).

"First Office Action mailed Nov. 2, 2023 with English translation", Chinese Patent Application No. 201980090867.1, (16 pages).

"First Office Action mailed on Feb. 1, 2024 with English translation", Chinese Patent Application No. 202080018865.4, (9 pages).

"First Office Action mailed on Mar. 25, 2024 with English translation", Chinese Patent Application No. 202080018919.7, (31 pages).

"Non Final Office Action mailed on Jun. 17, 2024", U.S. Appl. No. 18/348,732, (19 pages).

"Second Office Action with English translation mailed on Jul. 2, 2024", Chinese Patent Application No. 201980032005.3, (15 pages).

"Non Final Office Action mailed on Jun. 26, 2025", U.S. Appl. No. 18/348,732, (17 pages).

"Office Action mailed on Jul. 17, 2025 with English translation", Chinese Patent Application No. 202080079136.X, (42 pages).

"Penultimate Office Action mailed on Aug. 13, 2025 with English translation", Japanese Patent Application No. 2024-139589, (5 pages).

"Non Final Office Action mailed on Dec. 2, 2025", U.S. Appl. No. 18/517,915, (18 pages).

"First Office Action mailed Dec. 20, 2025 with English translation", Chinese Patent Application No. 202080079114.3, (10 pages).

"Non Final Office Action mailed on Feb. 3, 2026", U.S. Appl. No. 18/643,757, (14 pages).

"Second Office Action with English translation mailed on Feb. 24, 2026", Chinese Patent Application No. 202080079136.X, (52 pages).

"First Office Action mailed Mar. 11, 2026 with English translation", Japanese Patent Application No. 2025-94021, (10 pages).

"Office Action mailed on Mar. 17, 2026 with English translation", Japanese Patent Application No. 2025-087496, (14 pages).

* cited by examiner

Strong Matches

Weak Matches

1

SYSTEMS AND METHODS FOR VIRTUAL AND AUGMENTED REALITY

CROSS-REFERENCE TO RELATED APPLICATIONS

This application is a continuation of U.S. patent application Ser. No. 17/098,043, filed on Nov. 13, 2020, which claims priority from U.S. Provisional Patent Application No. 62/935,597, filed on Nov. 14, 2019, all of which is incorporated herein by reference in its entirety.

BACKGROUND OF THE INVENTION

1). Field of the Invention

This invention is related to connected mobile computing systems, methods, and configurations, and more specifically to mobile computing systems, methods, and configurations featuring at least one wearable component which may be utilized for virtual and/or augmented reality operation.

2). Discussion of Related Art

It is desirable that mixed reality, or augmented reality, near-eye displays be lightweight, low-cost, have a small form-factor, have a wide virtual image field of view, and be as transparent as possible. In addition, it is desirable to have configurations that present virtual image information in multiple focal planes (for example, two or more) in order to be practical for a wide variety of use-cases without exceeding an acceptable allowance for vergence-accommodation mismatch. Referring to FIG. 8, an augmented reality system is illustrated featuring a head-worn viewing component (2), a hand-held controller component (4), and an interconnected auxiliary computing or controller component (6) which may be configured to be worn as a belt pack or the like on the user. Each of these components may be operatively coupled (10, 12, 14, 16, 17, 18) to each other and to other connected resources (8) such as cloud computing or cloud storage resources via wired or wireless communication configurations, such as those specified by IEEE 802.11, Bluetooth®, and other connectivity standards and configurations. As described, for example, in U.S. patents application Ser. Nos. 14/555,585, 14/690,401, 14/331,218, 15/481,255, 62/627, 155, 62/518,539, 16/229,532, 16/155,564, 15/413,284, 16/020,541, 62/702,322, 62/206,765, 15,597,694, 16/221, 065, 15/968,673, 62/682,788, and 62/899,678 each of which is incorporated by reference herein in its entirety, various aspects of such components are described, such as various embodiments of the two depicted optical elements (20) through which the user may see the world around them along with visual components which may be produced by the associated system components, for an augmented reality experience. As illustrated in FIG. 8, such a system may also comprise various sensors configured to provide information pertaining to the environment around the user, including but not limited to various camera type sensors (such as monochrome, color/RGB, and/or thermal imaging components) (22, 24, 26), depth camera sensors (28), and/or sound sensors (30) such as microphones. There is a need for compact and persistently connected wearable computing systems and assemblies such as those described herein, which may be utilized to provide a user with the perception of rich augmented reality experiences.

SUMMARY OF THE INVENTION

This document describes certain aspects of what may be termed "the deep middle-end matcher", a neural network configured to match two sets of local features by jointly finding correspondences and rejecting non-matchable points. Such a neural network configuration may be utilized in association with spatial computing resources such as those illustrated in FIG. 8, including but not limited to the camera and processing resources that comprise such spatial computing systems. Within the deep middle-end matcher type of configuration, assignments may be estimated by solving an optimal transport problem, whose costs are predicted by a graph neural network. We describe a flexible context aggregation mechanism based on attention, which enables the deep middle-end matcher configuration to reason about the underlying 3D scene and feature assignments jointly. Compared to traditional, hand-designed heuristics, our technique learns priors over geometric transformations and regularities of the 3D world through end-to-end training from images to correspondences. The deep middle-end matcher outperforms other learned approaches and sets a new state-of-the-art on the task of pose estimation in challenging real-world indoor and outdoor environments. These methods and configurations match in real-time on a modern graphical processing unit ("GPU"), and can be readily integrated into modern structure-from-motion ("SfM") or simultaneous localization and mapping ("SLAM") systems, all of which may be incorporated into systems such as that illustrated in FIG. 8.

The invention provides a computer system including a computer-readable medium, a processor connected to the computer-readable medium and a set of instructions on the computer-readable medium. The set of instructions may include a deep middle-end matcher architecture that may include an attentional graph neural network having a keypoint encoder to map keypoint positions p and their visual descriptors d into a single vector, and alternating self-and cross-attention layers that, based on the vector, repeated L times to create representations f; and an optimal matching layer that creates an M by N score matrix from the representations f and finds an optimal partial assignment based on the M by N score matrix.

The computer system may further include that in the keypoint encoder, an initial representation $^{(0)}x_i$ for each keypoint i combines visual appearance and location, with the respective keypoint position embedded into a high-dimensional vector with a Multilayer Perceptron (MLP) as follows:

$$^{(0)}x_i = d_i + MLP(p_i).$$

The computer system may further include the keypoint encoder allows the attentional graph neural network to reason about appearance and position jointly.

The computer system may further include in the keypoint encoder includes a multiplex graph neural network having a single complete graph with nodes that are the keypoints of two images.

The computer system may further include the graph is a multiplex graph that has two types of undirected edges, namely intra-image edges (self edges; $E_{self}$) that connect keypoints i to all other keypoints within the same image and inter-image edges (cross edges, $E_{cross}$) that connect keypoints i to all keypoints in the other image and uses a message passing formulation to propagate information along both types of edges, such that the resulting multiplex graph neural network starts with a high-dimensional state for each node and computes at each layer an updated representation by simultaneously aggregating messages across all given edges for all nodes.

The computer system may further include if $^{(l)}\mathrm{x}^A{}_i$ is the intermediate representation for element i in image A at layer 1, the message $m_{E \to i}$ is the result of the aggregation from all keypoints $\{j:(i, j)\in\}$, where $E\in\{E_{self}, E_{cross}\}$, and a residual message passing update for all i in A is:

$$^{(l+1)}x_i^A = {}^{(l)}x_i^A + MLP\big(\big[{}^{(l)}x_i^A\|m_{\mathcal{E}\to i}\big]\big),$$

where $[\cdot\|\cdot]$ denotes concatenation.

The computer system may further include a fixed number of layers L with different parameters are chained and alternatively aggregate along the self and cross edges such that, starting from l=1, $E=E_{self}$ if l is odd and $E_{cross}$ if l is even.

The computer system may further include the alternating self-and cross-attention layers are computed with an attention mechanism computes the message $m_{E \to i}$ and performs the aggregation, wherein the self edges are based on self-attention and the cross edges are based on cross-attention, wherein, for a representation of i, a query $q_i$, retrieves values $v_j$ of some elements based on their attributes, the keys $k_j$, and the message is computed as weighted average of the values:

$$m_{\mathcal{E}\to i} = \sum_{j:(i,j)\in\mathcal{E}} \alpha_{ij}v_j,$$

The computer system may further include an attention mask $\alpha_{ij}$ is the Softmax over the key-query similarities:

$$\alpha_{ij} = \mathrm{Softmax}_j\,(q_i^\top k_j).$$

The computer system may further include the respective key, query, and value are computed as linear projections of deep features of the graph neural network, with a query keypoint i being in an image Q and all source keypoints are in image S, $(Q, S)\in\{A, B\}^2$, in the equation:

$$q_i = W_1{}^{(l)}x_i^Q + b_1$$
$$\begin{bmatrix} k_j \\ v_j \end{bmatrix} = \begin{bmatrix} W_2 \\ W_3 \end{bmatrix}{}^{(l)}x_i^S + \begin{bmatrix} b_2 \\ b_3 \end{bmatrix}.$$

The computer system may further include final matching descriptors of the alternating self- and cross-attention layers are linear projections:

$$f_i^A = W^{(L)}x_i^A + b \quad \forall\, i \in \mathcal{A},$$

The computer system may further include the optimal matching layer expresses a pairwise score for a set as the similarity of matching descriptors:

$$S_{i,j} = \,< f_i^A, f_j^B > \forall\,(i, j) \in \mathcal{A}\times\mathcal{B},$$

where $<\cdot, \cdot>$ is the inner product. As opposed to learned visual descriptors, the matching descriptors are not normalized, and their magnitude can change per feature and during training to reflect the prediction confidence.

The computer system may further include the optimal matching layer, for occlusion and visibility suppresses occluded keypoints and augments each set of keypoints with a dustbin score so that unmatched keypoints are explicitly assigned to dustbin scores.

The computer system may further include the score S is augmented to $\overline{S}$ by appending a new row and column, the point-to-bin and bin-to-bin scores, filled with a single learnable parameter:

$$\overline{S}_{i,N+1} = \overline{S}_{M+1,j} = \overline{S}_{M+1,N+1} = \alpha \in \mathbb{R}.$$

The computer system may further include the optimal matching layer finds the optimal partial assignment based on the M by N score matrix using the Sinkhorn algorithm for T iterations.

The computer system may further include after T iterations, we the optimal matching layer drops the dustbin scores and recovers $P=\overline{P}_{1:M,1:N}$, where $$P1_N \le 1_M \text{ and } P^\top 1_M \le 1_N.$$

is the original assignment and $$\overline{P}1_{N+1} = a \text{ and } \overline{P}^\top 1_{M+1} = b.$$

Is the assignment with the dustbin scored augmented.

The invention also provides a computer-implemented method system that may include mapping, with a keypoint encoder of an attentional graph neural network of a deep middle-end matcher architecture, keypoint positions p and their visual descriptors d into a single vector; and executing, with alternating self-and cross-attention layers of an attentional graph neural network of the deep middle-end matcher architecture, based on the vector, for L repeated times, to create representations f, and executing an optimal matching layer, of the attentional graph neural network of the deep middle-end matcher architecture, to create an M by N score matrix from the representations f and finding an optimal partial assignment based on the M by N score matrix.

BRIEF DESCRIPTION OF THE DRAWINGS

The invention is further described by way of example with reference to the accompanying drawings, wherein.

DETAILED DESCRIPTION OF THE INVENTION

Finding correspondences between points in images is a vital step for computer vision tasks dealing with 3D reconstruction or visual localization, such as Simultaneous Localization and Mapping (SLAM) and Structure-from-Motion (SfM). These estimate the 3D structure and camera poses from such correspondences after matching local features, a process known as data association. Factors such as large viewpoint change, occlusion, blur, and lack of texture make 2D-to-2D data association particularly challenging.

Figure 1:
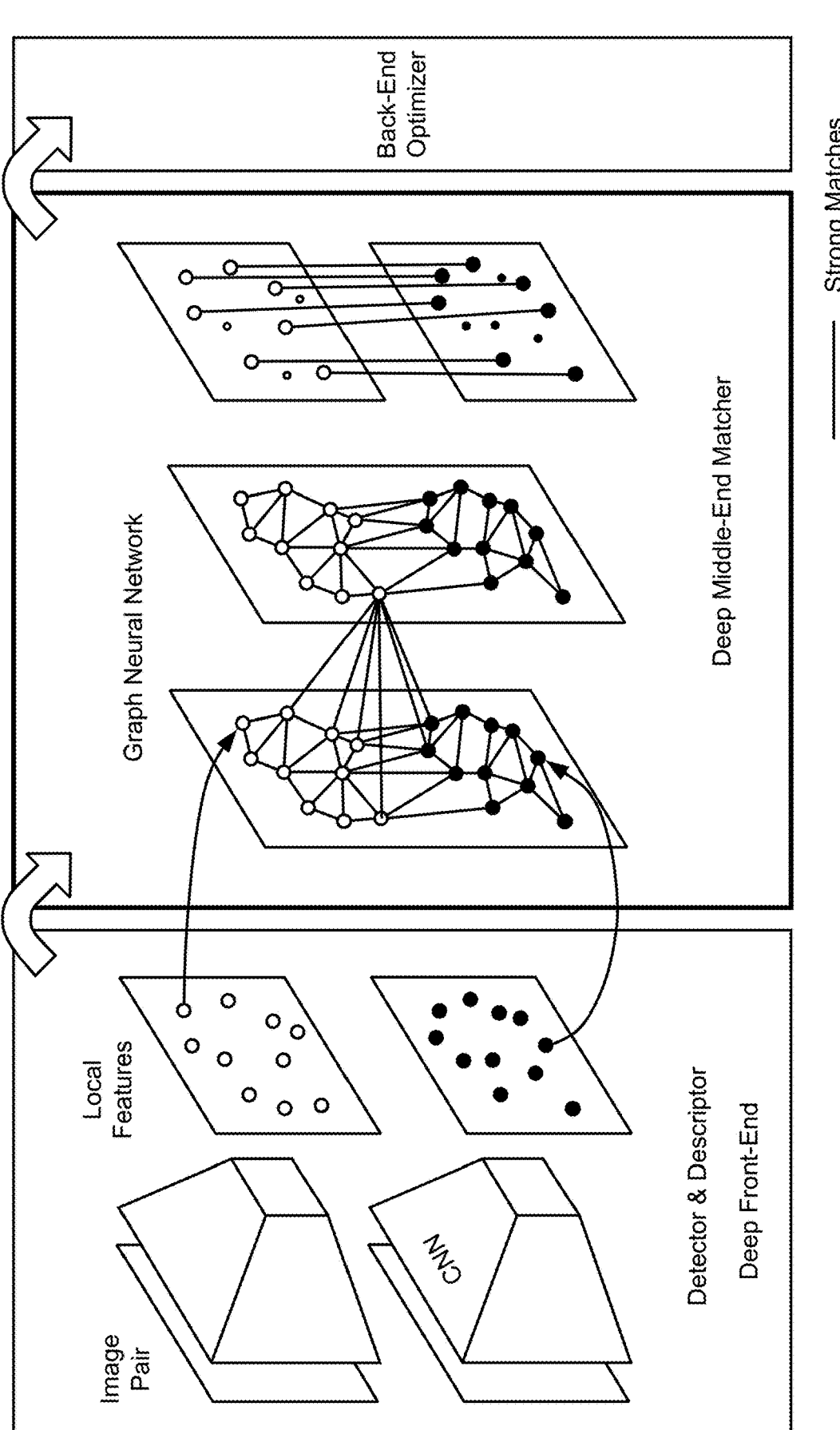
FIG. 1 is a representative sketch that illustrates feature matching with a deep middle-end matcher.

In this description, we present a new way of thinking about the feature matching problem. Instead of learning better task-agnostic local features followed by simple matching heuristics and tricks, we propose to learn the matching process from pre-existing local features using a novel neural architecture called the deep middle-end matcher (DMEM). In the context of SLAM that typically decomposes the problem into the visual feature detection front-end and the bundle adjustment or pose estimation back-end, our network lies directly in the middle-the deep middle-end matcher is a learnable middle-end. FIG. 1 illustrates feature matching with the deep middle-end matcher. Our approach establishes pointwise correspondences between challenging image pairs. It takes off-the-shelf local features as input and uses an attentional graph neural network to solve an assignment optimization problem. The deep middle-end matcher acts as a middle-end and handles partial point visibility and occlusion elegantly, producing a partial assignment matrix.

In this work, learning feature matching is viewed as finding the partial assignment between two sets of local features. We revisit the classical graph-based strategy of matching by solving a linear assignment problem, which, when relaxed to an optimal transport problem, can be solved differentiably [See references 50, 9, 31 below]. The cost function of this optimization is predicted by a Graph Neural Network (GNN). Inspired by the success of the Transformer [see reference 48 below], it uses self-(intra-image) and cross-(inter-image) attention to leverage both spatial relationships of the keypoints and their visual appearance. This formulation enforces the assignment structure of the predictions while enabling the cost to learn complex priors, elegantly handling occlusion and non-repeatable keypoints. Our method is trained end-to-end from images to correspondences—we learn priors for pose estimation from a large annotated dataset, enabling the deep middle-end matcher to reason about the 3D scene and the assignment. Our work can be applied to a variety of multiple-view geometry problems that require high-quality feature correspondences.

Figure 2:
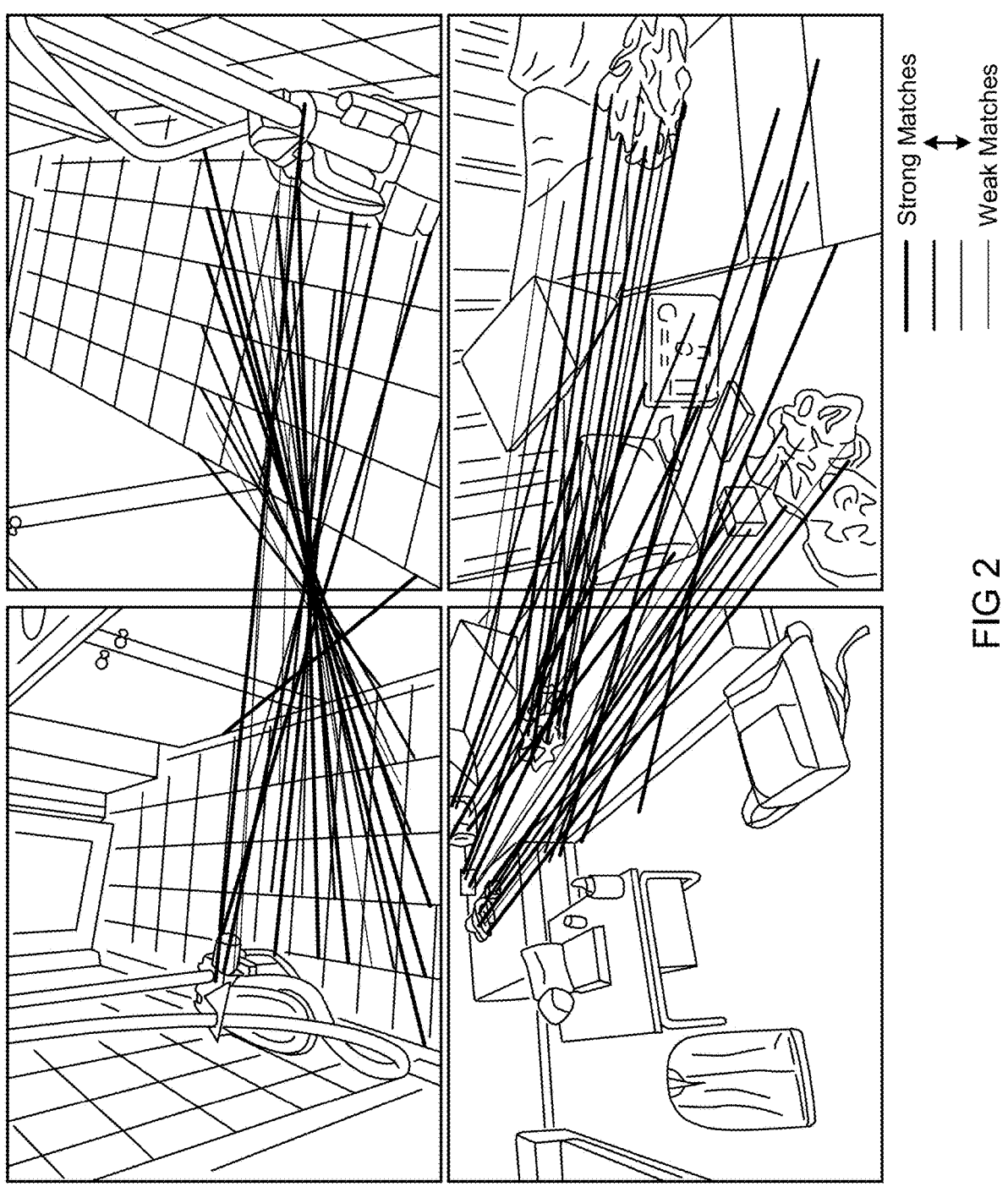
FIG. 2 shows correspondences estimated by the deep middle-end matcher for two difficult indoor image pairs.

We show the superiority of the deep middle-end matcher compared to both handcrafted matchers and learned inlier classifiers. FIG. 2 shows correspondences estimated by the deep middle-end matcher for two difficult indoor image pairs. The deep middle-end matcher successfully estimates an accurate pose while other learned or handcrafted methods fail (correct correspondences in green). The proposed method brings the most substantial improvements when combined with SuperPoint [see reference 14 below], a deep front-end, thereby advancing the state-of-the-art on the tasks of homography estimation and indoor and outdoor pose estimation, and paving the way towards deep SLAM.

2. Related Work

Local feature matching is generally performed by i) detecting interest point, ii) computing visual descriptors, iii) matching these with a Nearest Neighbor (NN) search, iv) filtering incorrect matches, and finally v) estimating a geometric transformation. The classical pipeline developed in the 2000s is often based on SIFT [see reference 25 below], filters matches with Lowe's ratio test [see reference 25 below], the cross-check, and heuristics like neighborhood consensus [see references 46, 8, 5, 40 below], and finds a transformation with a robust solver like RANSAC [see references 17, 35 below].

Recent works on deep learning for matching often focus on learning better sparse detectors and local descriptors [see references 14, 15, 29, 37, 54 below] from data using Convolutional Neural Networks (CNNs). To improve their discriminativeness, some works explicitly look at a wider context using regional features [see reference 26 below] or log-polar patches [see reference 16 below]. Other approaches learn to filter matches by classifying them into inliers and outliers [see references 27, 36, 6, 56 below]. These operate on sets of matches, still estimated by NN search, and thus ignore the assignment structure and discard visual information. Works that actually learn to match have so far focused on dense matching [see reference 38 below] or 3D point clouds [see reference 52 below], and still exhibit such limitations. In contrast, our learnable middle-end simultaneously performs context aggregation, matching, and filtering in a single end-to-end architecture.

Graph matching problems are usually formulated as quadratic assignment problems, which are NP-hard, requiring expensive, complex, and thus impractical solvers [see reference 24 below]. For local features, the computer vision literature of the 2000s [see references 4, 21, 45 below] uses handcrafted costs with many heuristics, making it complex and fragile. Caetano et al. [see reference 7 below] learn the cost of the optimization for a simpler linear assignment, but only use a shallow model, while our deep middle-end matcher learns a flexible cost using a neural network. Related to graph matching is the problem of optimal transport [see reference 50 below]—it is a generalized linear assignment with an efficient yet simple approximate solution, the Sinkhorn algorithm [see references 43, 9, 31 below].

Deep Learning for sets such as point clouds aims at designing permutation equivariant or invariant functions by aggregating information across elements. Some works treat all of them equally, through global pooling [see references 55, 32, 11 below] or instance normalization [see references 47, 27, 26 below], while others focus on a local neighborhood in coordinate or feature space [see references 33, 53 below]. Attention [see references 48, 51, 49, 20 below] can perform both global and data-dependent local aggregation by focusing on specific elements and attributes, and is thus more flexible. Our work uses the fact that it can be seen as a particular instance of a Message Passing Graph Neural Network [see references 18, 3 below] on a complete graph. By applying attention to multi-edge, or multiplex, graphs, similar to [see references 22, 57 below], the deep middle-end matcher can learn complex reasoning about the two sets of local features.

3. The Deep Middle-End Matcher Architecture

Figure 3:
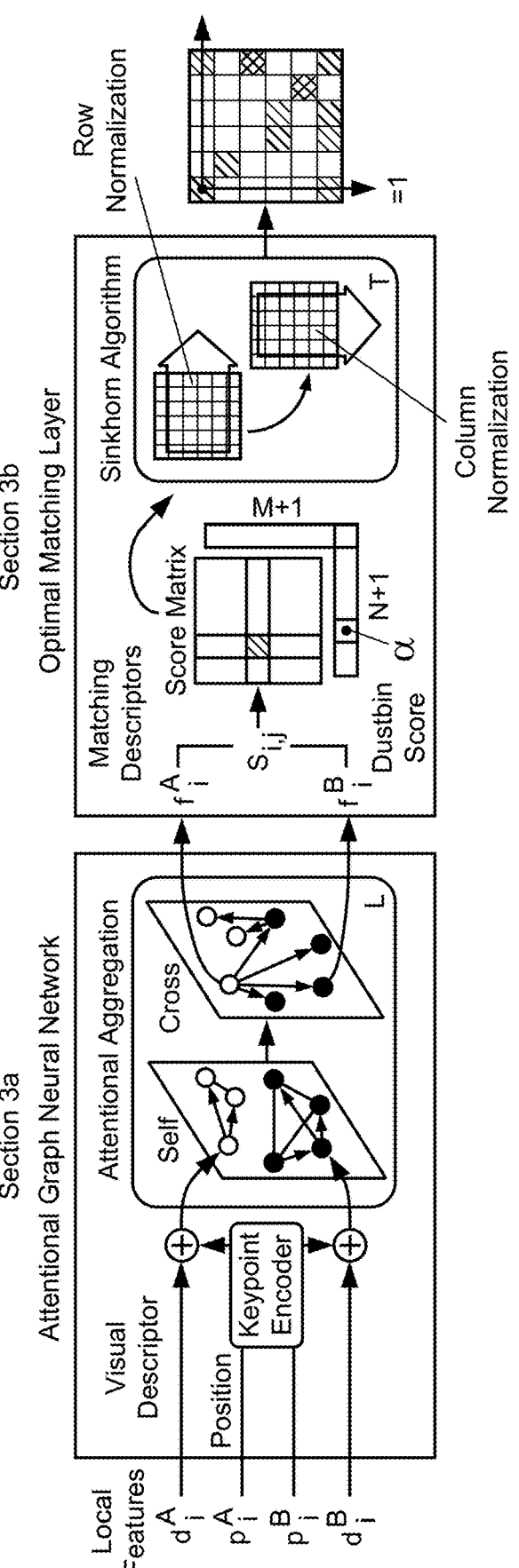
FIG. 3 is a representative sketch that shows how we formulate the deep middle-end matcher to solve an optimization problem.

Motivation: In the image matching problem, some regularities of the world could be leveraged: the 3D world is largely smooth and sometimes planar, all correspondences for a given image pair derive from a single epipolar transform if the scene is static, and some poses are more likely than others. In addition, 2D keypoints are usually projections of salient 3D points, like corners or blobs, thus correspondences across images must adhere to certain physical constraints: i) a keypoint can have at most a single correspondence in the other image; and ii) some keypoints will be unmatched due to occlusion and failure of the detector. An effective model for feature matching should aim at finding all correspondences between reprojections of the same 3D points and identifying keypoints that have no matches. FIG. 3 shows how we formulate the deep middle-end matcher as solving an optimization problem, whose cost is predicted by a deep neural network. The deep middle-end matcher is made up of two major components: the attentional graph neural network (Section 3a), and the optimal matching layer (Section 3b). The first component uses a keypoint encoder to map keypoint positions p and their visual descriptors d into a single vector, and then uses alternating self-and cross-attention layers (repeated L times) to create more powerful representations f. The optimal matching layer creates an M by N score matrix, augments it with dustbins, then finds the optimal partial assignment using the Sinkhorn algorithm (for T iterations). This alleviates the need for domain expertise and heuristics—we learn relevant priors directly from the data.

Formulation: Consider two images A and B, each with a set of keypoint positions p and associated visual descriptors d—we refer to them jointly (p, d) as the local features. Keypoints consist of x and y image coordinates as well as a detection confidence c, $p_i:=(x, y, c)_i$. Visual descriptors $d_i \in R^D$ can be those extracted by a CNN like SuperPoint or traditional descriptors like SIFT. Images A and B have M and N local features and their sets of keypoint indices are $A:=\{1, \ldots, M\}$ and $B:=\{1, \ldots, N\}$, respectively.

Partial Assignment: Constraints i) and ii) mean that correspondences derive from a partial assignment between the two sets of keypoints. For the integration into downstream tasks and better interpretability, each possible correspondence should have a confidence value. We consequently define a partial soft assignment matrix $P \in [0,1]^{M \times N}$ as:

$$\bar{P}1_N \le 1_M \text{ and } \bar{P}^\top 1_M \le 1_N. \tag{1}$$

Our goal is the following: design a neural network that predicts the assignment P from two sets of local features.

3.1. Attentional Graph Neural Network

The first major block of the deep middle-end matcher (see Section 3a) is the attentional graph neural network whose job is the following: given initial local features, compute $f_i \in R^D$, the matching descriptors, by letting the features communicate with each other. Long-range feature communication is vital for robust matching and requires aggregation of information from within an image as well as across an image pair.

Intuitively, the distinctive information about a given keypoint depends on its visual appearance and its location, but also its spatial and visual relationship with respect to other co-visible keypoints, e.g. neighboring or salient ones. On the other hand, knowledge of keypoints in the second image can help to resolve ambiguities by comparing candidate matches or estimating the relative photometric or geometric transformation from global and unambiguous clues.

When asked to match a given ambiguous keypoint, humans look back-and-forth at both images: they sift for tentative matching keypoints, examine each of them, and look for contextual clues that help to disambiguate the true match from other self-similarities. This hints at an iterative process that can focus its attention on specific locations.

Keypoint Encoder: The initial representation $^{(0)}x_i$ for each keypoint i combines visual appearance and location. We embed the keypoint position into a high-dimensional vector with a Multilayer Perceptron (MLP) as follows:

$$^{(0)}x_i = d_i + MLP(p_i). \tag{2}$$

The encoder allows the network to reason about both appearance and position jointly (this is especially powerful with an attention mechanism) and is an instance of the "positional encoder" introduced in the Transformer [see reference 48 below].

Multiplex Graph Neural Network: We consider a single complete graph whose nodes are the keypoints of both images. The graph has two types of undirected edges—it is a multiplex graph. Intra-image edges, or self edges, $E_{self}$, connect keypoints i to all other keypoints within the same image. Inter-image edges, or cross edges, $E_{cross}$, connect keypoints i to all keypoints in the other image. We use the message passing formulation [see references 18, 3 below] to propagate information along both types of edges. The resulting Multiplex Graph Neural Network starts with a high-dimensional state for each node and computes at each layer an updated representation by simultaneously aggregating messages across all given edges for all nodes.

Let $^{(l)}x^A_i$ be the intermediate representation for element i in image A at layer 1. The message $m_{E \to i}$ is the result of the aggregation from all keypoints $\{j:(i, j) \in \}$, where $E \in \{E_{self}, E_{cross}\}$. The residual message passing update for all i in A is:

$$^{(l+1)}x^A_i = {}^{(l)}x^A_i + MLP([{}^{(l)}x^A_i \| m_{\mathcal{E} \to i}]), \tag{3}$$

where $[\cdot \| \cdot]$ denotes concatenation. A similar update can be simultaneously performed for all keypoints in image B. A fixed number of layers L with different parameters are chained and alternatively aggregate along the self and cross edges. As such, starting from l=1, $E=E_{self}$ if l is odd and $E=E_{cross}$ if l is even.

Attentional Aggregation: An attention mechanism computes the message $m_{E \to i}$ and performs the aggregation. Self edges are based on self-attention [see reference 48 below] and cross edges are based on cross-attention. Akin to database retrieval, a representation of i, the query $q_i$, retrieves the values $v_j$ of some elements based on their attributes, the keys $k_j$. We compute the message as weighted average of the values:

$$m_{\mathcal{E} \to i} = \sum_{j:(i,j) \in \varepsilon} \alpha_{ij} v_j, \tag{4}$$

where the attention mask $\alpha_{ij}$ is the Softmax over the key-query similarities:

$$\alpha_{ij} = \text{Softmax}_j \, (q_i^T k_j).$$

The key, query, and value are computed as linear projections of deep features of the graph neural network. Considering that query keypoint i is in the image Q and all source keypoints are in image S, $(Q, S) \in \{A, B\}^2$, we can write:

$$q_i = W_1^{(\ell)} x_i^Q + b_1 \qquad (5)$$

$$\begin{bmatrix} k_j \\ v_j \end{bmatrix} = \begin{bmatrix} W_2 \\ W_3 \end{bmatrix}^{(\ell)} x_i^S + \begin{bmatrix} b_2 \\ b_3 \end{bmatrix}.$$

Each layer 1 has its own projection parameters, and they are shared for all keypoints of both images. In practice, we improve the expressivity with multi-headed attention [see reference 48 below].

Figure 4:
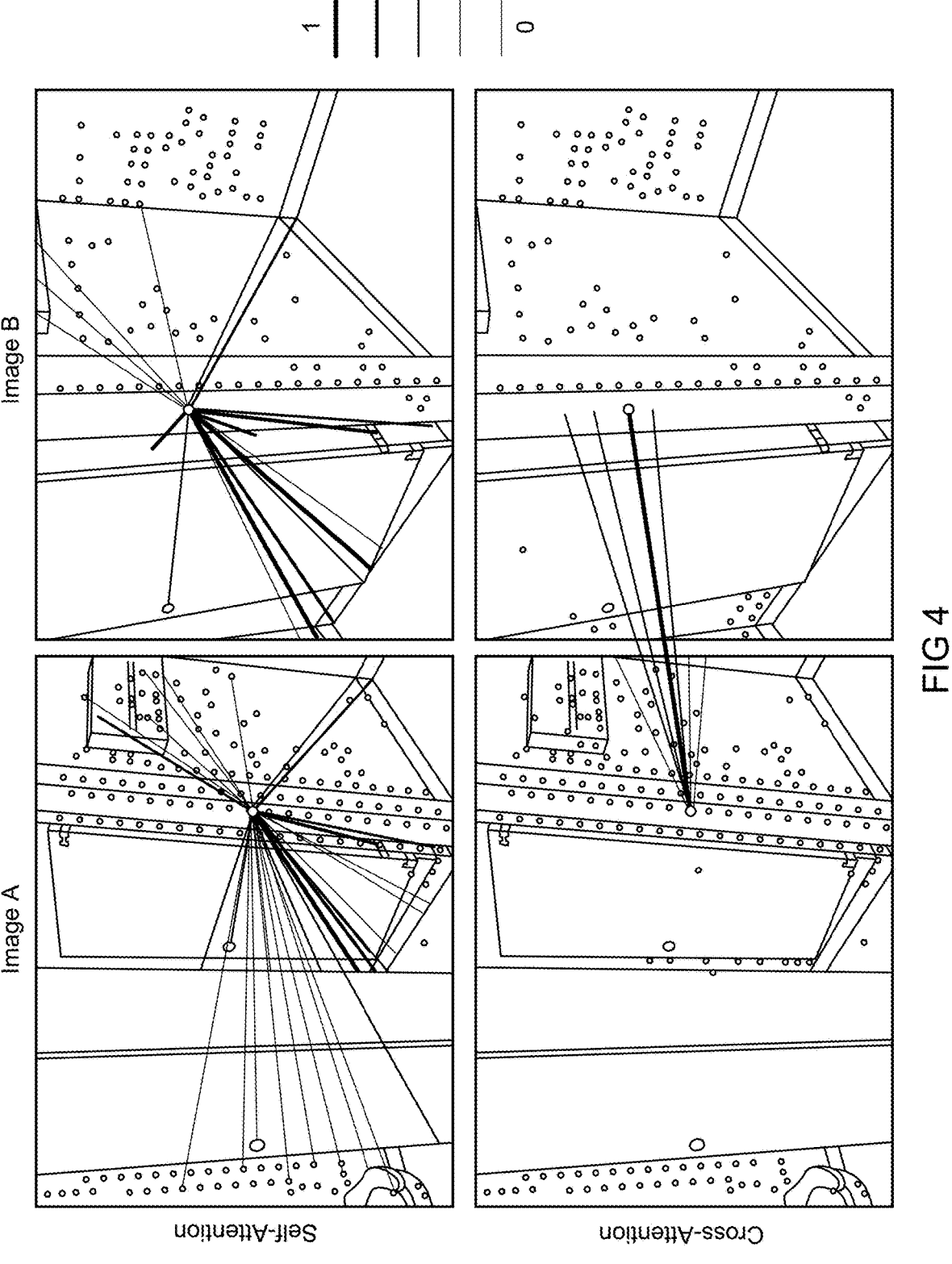
FIG. 4 are images that show masks as rays.

Our formulation provides maximum flexibility as the network can learn to focus on a subset of key-points based on specific attributes. In FIG. 4, masks $\alpha$ij are shown as rays. Attentional aggregation builds a dynamic graph between keypoints. Self-attention (top) can attend anywhere in the same image, e.g., distinctive locations, and is thus not restricted to nearby locations. Cross-attention (bottom) attends to locations in the other image, such as potential matches that have a similar local appearance. The deep middle-end matcher can retrieve, or attend based on both appearance and keypoint location as they are encoded in the representation $x_i$. This includes attending to a nearby keypoint and retrieving the relative positions of similar or salient keypoints. This enables representations of the geometric transformation and the assignment. The final matching descriptors are linear projections:

$$f_i^A = W^{(L)} x_i^A + b \quad \forall \, i \in \mathcal{A}, \qquad (6)$$

and similarly for keypoints in B.

3.2. Optimal Matching Layer

The second major block of the deep middle-end matcher (see Section 3b) is the optimal matching layer, which produces a partial assignment matrix. As in the standard graph matching formulation, the assignment P can be obtained by computing a score matrix $S \in R^{M \times N}$ for all possible matches and maximizing the total score $\Sigma_{i,j} S_{i,j} P_{i,j}$ under constraints in Equation 1. This is equivalent to solving a linear assignment problem.

Score Prediction: Building a separate representation for all $(M+1) \times (N+1)$ potential matches would be prohibitive. We instead express the pairwise score as the similarity of matching descriptors:

$$S_{i,j} = \, < f_i^A, f_j^B > \forall \, (i, j) \in \mathcal{A} \times \mathcal{B}, \qquad (7)$$

where $<\cdot, \cdot>$ is the inner product. As opposed to learned visual descriptors, the matching descriptors are not normalized, and their magnitude can change per feature and during training to reflect the prediction confidence.

Occlusion and Visibility: To let the network suppress occluded keypoints, we augment each set with a dustbin so that unmatched keypoints are explicitly assigned to it. This technique is common in graph matching, and dustbins have also been used by SuperPoint [see reference 14 below] to account for image cells that might not have a detection. We augment the score S to $\overline{S}$ by appending a new row and column, the point-to-bin and bin-to-bin scores, filled with a single learnable parameter:

$$\overline{S}_{i,N+1} = \overline{S}_{M+1,j} = \overline{S}_{M+1,N+1} = \alpha \in \mathbb{R}. \qquad (8)$$

While keypoints in A will be assigned to a single keypoint in B or the dustbin, each dustbin has as many matches as there are keypoints in the other set: N, M for dustbins in A, B respectively. We denote as $$a = [\, 1_M^T \quad N \,]^T \text{ and } b = [\, 1_N^T \quad M \,]^T$$

the number of expected matches for each keypoint and dustbin in A and B. The augmented assignment $\overline{P}$ now has the constraints:

$$\overline{P}1_{N+1} = a \text{ and } \overline{P}^\top 1_{M+1} = b. \qquad (9)$$

Sinkhorn Algorithm: The solution of the above optimization problem corresponds to the optimal transport [see reference 31 below] between discrete distributions a and b with score $\overline{S}$. It can be approximately solved with the Sinkhorn algorithm [see references 43, 9 below], a differentiable version of the Hungarian algorithm [see reference 28 below], classically used for bipartite matching. It solves a regularized transport problem, naturally resulting in a soft assignment. This normalization amounts to iteratively performing alternating Softmax along rows and columns, and is thus easily parallelized on GPU. After T iterations, we drop the dustbins and recover $P=\overline{P}_{1:M,1:N}$.

3.3. Loss

By design, both the graph neural network and the optimal matching layer are differentiable—this enables backpropagation from matches to visual descriptors. The deep middle-end matcher is trained in a supervised manner from ground truth matches $M=\{(i, j)\} \subset A \times B$. These are estimated from ground truth relative transformations—using poses and depth maps or homographies. This also lets us label some keypoints $I \subseteq A$ and $J \subseteq B$ as unmatched if they do not have any reprojection in their vicinity. Given the labels, we minimize the negative log-likelihood of the assignment $\overline{P}$:

$$\text{Loss} = - \sum_{(i,j) \in M} \log \overline{P}_{i,j} - \sum_{i \in I} \log \overline{P}_{i,N+1} - \sum_{j \in J} \log \overline{P}_{M+1,j}. \qquad (10)$$

This supervision aims at simultaneously maximizing the precision and the recall of the matching.

3.4. Comparisons to Related Work

The deep middle-end matcher vs. inlier classifiers [see references 27, 56 below]: the deep middle-end matcher benefits from a strong inductive bias by being entirely permutation equivariant with respect to both images and local features. It additionally embeds the commonly-used mutual check constraint directly into the training: any match with probability $P_{i,j}$ greater than 0.5 is necessarily mutually consistent.

The deep middle-end matcher vs. Instance Normalization [see reference 47 below]: Attention, as used by the deep middle-end matcher, is a more flexible and powerful context aggregation mechanism than instance normalization, which treats all keypoints equally and is used by previous work on feature matching [see references 27, 56, 26 below].

The deep middle-end matcher vs. ContextDesc[see reference 26 below]: the deep middle-end matcher can jointly reason about appearance and position while ContextDesc processes them separately. Additionally, ContextDesc is a front-end that additionally requires a larger regional extractor, and a loss for keypoints scoring. The deep middle-end matcher only needs local features, learned or handcrafted, and can thus be a simple drop-in replacement of existing matchers.

The deep middle-end matcher vs. Transformer[see reference 48 below]: the deep middle-end matcher borrows the self-attention from the Transformer, but embeds it into a graph neural network, and additionally introduces the cross-attention, which is symmetric. This simplifies the architecture and results in better feature reuse across layers.

4. Implementation Details

The deep middle-end matcher can be combined with any local feature detector and descriptor but works particularly well with SuperPoint [see reference 14 below], which produces repeatable and sparse keypoints—enabling very efficient matching. Visual descriptors are bilinearly sampled from the semi-dense feature map, which is differentiable. Both local feature extraction and subsequent "gluing" are directly performed on the GPU. At test time, in order to extract matches from the soft assignment, one can use the confidence threshold to retain some, or simply use all of them and their confidence in a subsequent step, such as weighted pose estimation.

Architecture details: All intermediate representations (key, query value, descriptors) have the same dimension D=256 as the SuperPoint descriptors. We use L=9 layers of alternating multi-head self- and cross-attentions with 4 heads each, and perform T=100 Sinkhorn iterations—in log-space for numerical stability. The model is implemented in PyTorch [see reference 30 below] and runs in real-time on a GPU: a forward pass takes on average 150 ms (7 FPS).

Training details: To allow for data augmentation, Super-Point detect and describe steps are performed on-the-fly as batches during training. A number of random keypoints are further added for efficient batching and increased robustness. More details are provided in Appendix A.

5. Experiments

5.1. Homography Estimation

We perform a large-scale homography estimation experiment using real images and synthetic homographies with both robust (RANSAC) and non-robust (DLT) estimators.

Dataset: We generate image pairs by sampling random homographies and applying random photometric distortions to real images, following a recipe similar to [see references 12, 14, 37, 36 below]. The underlying images come from the set of 1M distractor images in the Oxford and Paris dataset [see reference 34 below], split into training, validation, and test sets.

Baselines: We compare the deep middle-end matcher against several matchers applied to SuperPoint local features—the Nearest Neighbor (NN) matcher and various outlier rejectors: the mutual check (or cross-check), PointCN [see reference 27 below], and Order-Aware Network (OANet) [see reference 56 below]. All learned methods, including the deep middle-end matcher, are trained on ground-truth correspondences, found by projecting keypoints from one image to the other. We generate homographies and photometric distortions on-the-fly—an image pair is never seen twice during training.

Metrics: Match precision (P) and recall (R) are computed from the ground truth correspondences. Homography estimation is performed with both RANSAC and the Direct Linear Transformation [see reference 19 below] (DLT), which has a direct least-squares solution. We compute the mean reprojection error of the four corners of the image and report the area under the cumulative error curve (AUC) up to a value of 10 pixels.

Results: the deep middle-end matcher is sufficiently expressive to master homographies, achieving 98% recall and high precision. Table 1 shows Homography estimation for the deep middle-end matcher, DLT and RANSAC. The deep middle-end matcher recovers almost all possible matches while suppressing most outliers. Because the deep middle-end matcher correspondences are high-quality, the Direct Linear Transform (DLT), a least-squares based solution with no robustness mechanism, outperforms RANSAC. The estimated correspondences are so good that a robust estimator is not required—the deep middle-end matcher works even better with DLT than RANSAC. Outlier rejection methods like PointCN and OANet cannot predict more correct matches than the NN matcher itself, overly relying on the initial descriptors.

TABLE 1

| Local features | Matcher | Homography estimation AUC | | P | R |
| | | RANSAC | DLT | | |
|---|---|---|---|---|---|
| SuperPoint | NN | 39.47 | 0.00 | 21.7 | 65.4 |
| | DMEM 1 | 42.45 | 0.24 | 43.8 | 56.5 |
| | NN + PointCN | 43.02 | 45.40 | 76.2 | 64.2 |
| | NN + OANet | 44.31 | 49.85 | 80.8 | 64.5 |
| | SuperGlue | 53.67 | 65.85 | 90.7 | 98.3 |

5.2. Indoor Pose Estimation

Indoor image matching is very challenging due to the lack of texture, the abundance of self-similarities, the complex 3D geometry of scenes, and large viewpoint changes. As we show in the following, the deep middle-end matcher can effectively learn priors to overcome these challenges.

Dataset: We use ScanNet [see reference 10 below], a large-scale indoor dataset composed of monocular sequences with ground truth poses and depth images as well as well-defined training, validation, and test splits corresponding to different scenes. Past works select training and evaluation pairs based on time difference [see references 29, 13 below] or SfM co-visibility [see references 27, 56, 6 below], usually computed using SIFT. We argue that this limits the difficulty of the pairs, and instead select these based on an overlap score computed for all possible image pairs in a given sequence using only ground truth poses and depth. This results in significantly wider-baseline pairs, which corresponds to the current frontier for real-world indoor image matching. Discarding pairs with too small or too large overlap, we obtain 230M training pairs and sample 1500 test pairs. More details are provided in Appendix A.

Metrics: As in previous work [see references 27, 56, 6 below], we report the AUC of the pose error at the thresholds (5°,10°,20°), where the pose error is the maximum of the angular errors in rotation and translation. Relative pose is obtained from essential matrix estimation with RANSAC. We also report the match precision and the matching score [see references 14, 54 below], where a match is deemed correct based on its epipolar distance.

Baselines: We evaluate the deep middle-end matcher and various baseline matchers using both root-normalized SIFT

Figure 5:
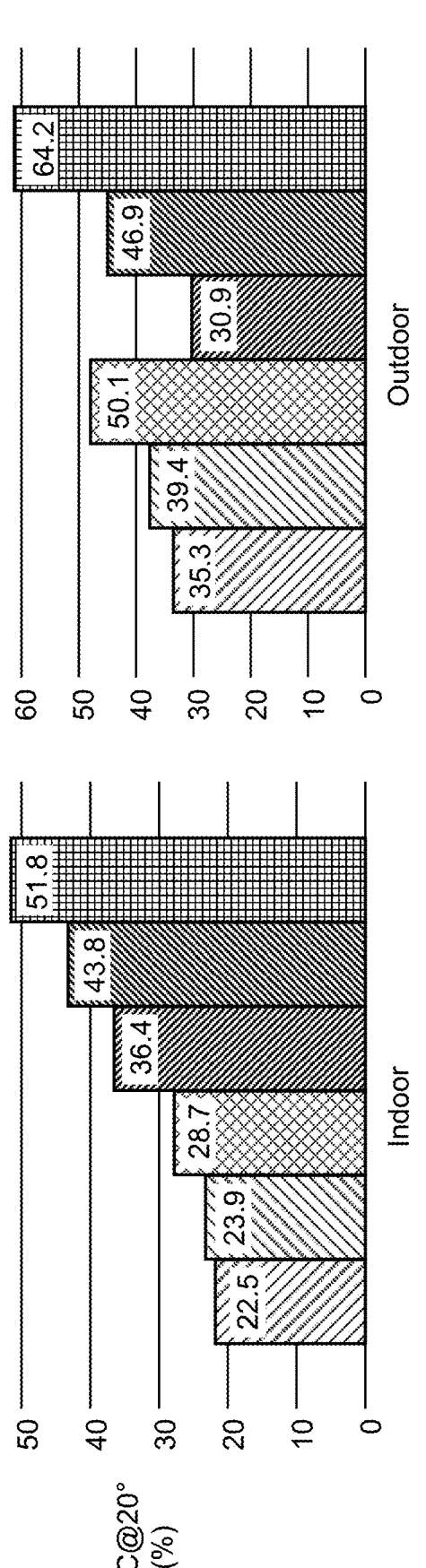
FIG. 5 are graphs that show indoor and outdoor pose estimation.

14 error, the matching score (MS) and precision (P), all in Pose estimation AUC percents. The deep middle-end matcher outperforms all handcrafted and learned matchers when applied to both SIFT and SuperPoint. These benefits are substantial when applied to both SIFT and SuperPoint. FIG. 5 shows indoor and outdoor pose estimation. The deep middle-end matcher significantly improves the pose accuracy over OANet, a state-of-the-art outlier rejection neural network. It has a significantly higher precision than other learned matchers, demonstrating its higher representation power. It also produces a larger number of correct matches-up to 10 times more than the ratio test when applied to SIFT, because it operates on the full set of possible matches, rather than the limited set of nearest neighbors. SuperPoint and the deep middle-end matcher together achieve state-of-the-art results on indoor pose estimation. They complement well each other since repeatable keypoints make it possible to estimate a larger number of correct matches even in very challenging situations—see FIG. 2.

TABLE 2

| Local features | Matcher | Pose estimation AUC | | | P | MS |
|---|---|---|---|---|---|---|
| | | @5° | @10° | @20° | | |
| ORB | NN + GMS | 5.21 | 13.65 | 25.36 | 72.0 | 5.7 |
| D2-Net | NN + mutual | 5.25 | 14.53 | 27.96 | 46.7 | 12.0 |
| ContextDesc | NN + ratio test | 6.64 | 15.01 | 25.75 | 51.2 | 9.2 |
| SIFT | NN + ratio test | 5.83 | 13.06 | 22.47 | 40.3 | 1.0 |
| | NN + OANet | 5.77 | 13.17 | 23.93 | 38.0 | 4.3 |
| | NN + NG-RANSAC | 6.19 | 13.80 | 23.73 | 61.9 | 0.7 |
| | DMEM | 6.71 | 15.70 | 28.67 | 74.2 | 9.8 |
| SuperPoint | NN + mutual | 9.43 | 21.53 | 36.40 | 50.4 | 18.8 |
| | NN + distance + mutual | 9.82 | 22.42 | 36.83 | 63.9 | 14.6 |
| | NN + GMS | 8.39 | 18.96 | 31.56 | 50.3 | 19.0 |
| | NN + PointCN | 11.40 | 25.47 | 41.41 | 71.8 | 25.5 |
| | NN + OANet | 11.76 | 26.90 | 43.85 | 74.0 | 25.7 |
| | DMEM | 16.16 | 33.81 | 51.84 | 84.4 | 31.5 |

[see references 25, 2 below] and SuperPoint [see reference 14 below] features. The deep middle-end matcher is trained with correspondences and unmatched keypoints derived from ground-truth poses and depth. All baselines are based on the Nearest Neighbor (NN) matcher and potentially an outlier rejection method. In the "Handcrafted" category, we consider the simple cross-check (mutual), ratio test [see reference 25 below], descriptor distance threshold, and the more complex GMS [see reference 5 below]. Methods in the "Learned" category are PointCN [see reference 27 below], and its follow-ups OANet [see reference 56 below] and NG-RANSAC [see reference 6 below]. We retrain PointCN and OANet on ScanNet for both SuperPoint and SIFT with the classification loss using the above-defined correctness criterion and their respective regression losses. For NG-RANSAC, we use the original trained model. We do not include any graph matching methods as they are orders of magnitude too slow for the number of keypoints that we consider. We report other local features as reference: ORB [see reference 39 below] with GMS, D2-Net [see reference 15 below], and ContextDesc [see reference 26 below] using the publicly available trained models.

Figure 6:
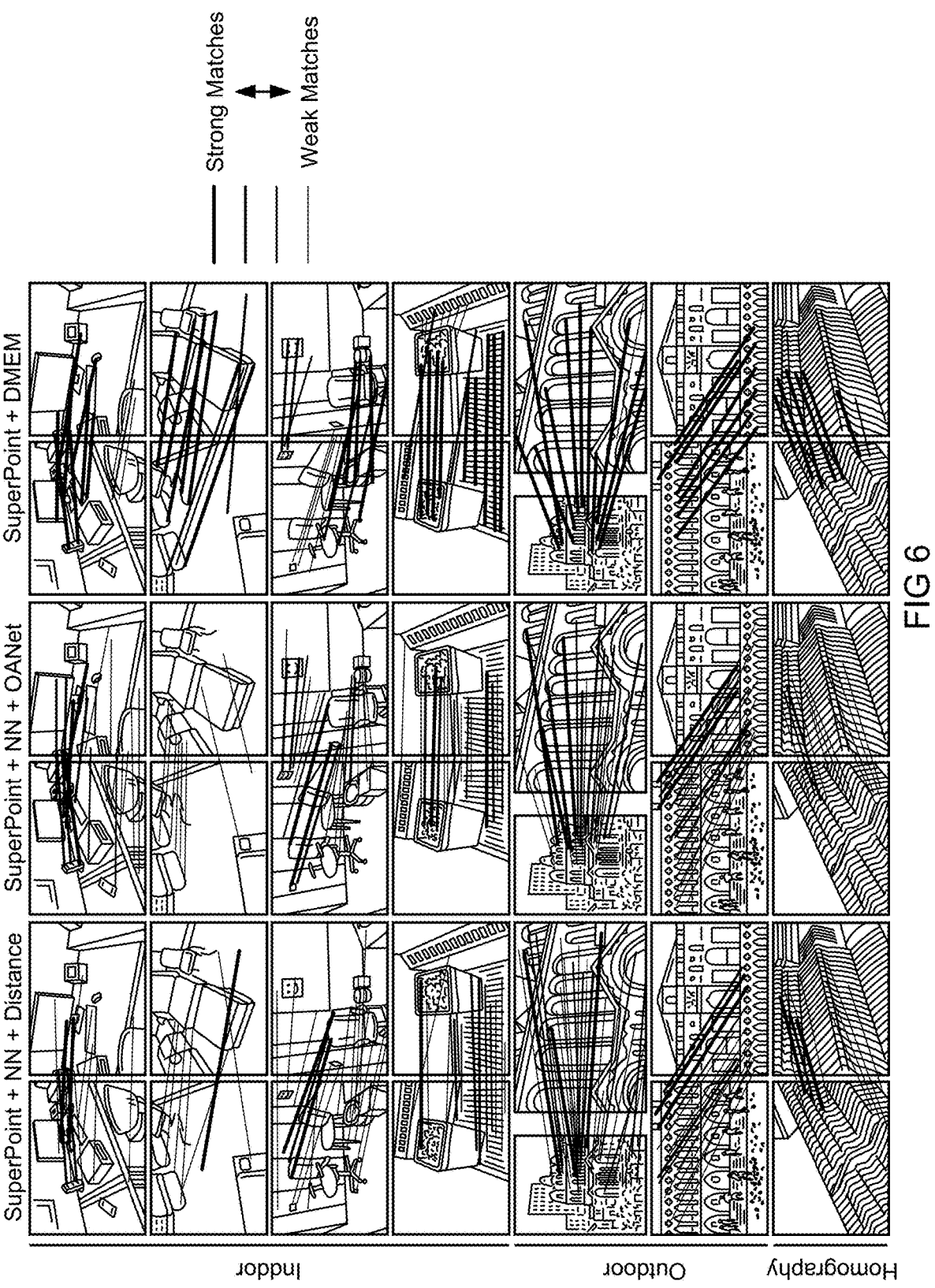
FIG. 6 shows qualitative image matches.

Results: the deep middle-end matcher enables significantly higher pose accuracy compared to both handcrafted and learned matchers. Table 2 shows wide-baseline indoor pose estimation on Scan-Net. We report the AUC of the pose In FIG. 6 shows qualitative image matches. We compare the deep middle-end matcher to the Nearest Neighbor (NN) matcher with two outlier rejectors, handcrafted and learned, in three environments. The deep middle-end matcher consistently estimates more correct matches (green lines) and fewer mismatches (red lines), coping with repeated texture, large viewpoint, and illumination changes.

5.3. Outdoor Pose Estimation

As outdoor image sequences present their own set of challenges (e.g., lighting changes and occlusion), we train and evaluate the deep middle-end matcher for pose estimation in an outdoor setting. We use the same evaluation metrics and baseline methods as in the indoor pose estimation task.

Dataset: We evaluate on the PhotoTourism dataset, which is part of the CVPR'19 Image Matching Challenge [see reference 1 below]. It is a subset of the YFCC100M dataset [see reference 44 below] and has ground truth poses and sparse 3D models obtained from an off-the-shelf SfM tool [see references 29, 41, 42 below]. For training, we use the MegaDepth dataset [see reference 23 below], which also has clean depth maps computed with multi-view stereo. Scenes that are in the PhotoTourism test set are removed from the training set.

Results: Table 3 shows outdoor pose estimation on the PhotoTourism dataset. Matching SuperPoint and SIFT features with the deep middle-end matcher results in significantly higher pose accuracy (AUC), precision (P), and matching score (MS) than with handcrafted or other learned methods. The deep middle-end matcher outperforms all baselines, at all relative pose thresholds, when applied to both SuperPoint and SIFT. Most notably, the precision of the resulting matching is very high (84.9%), reinforcing the analogy that the deep middle-end matcher "glues" together local features.

network inspired by the Trans-former's success in NLP—for local feature matching. We believe that the data association component of the 3D reconstruction pipeline has not received adequate attention from the research community, and powerful learning-based middle-ends are our solution. The deep middle-end matcher boosts the receptive field of local features and downplays features whose correspondences are missing, effectively performing the roles of both ContextDesc and inlier classification. Importantly, the inner-workings of the deep middle-end matcher are learned

TABLE 3

| Local features | Matcher | Pose estimation AUC | | | P | MS |
|---|---|---|---|---|---|---|
| | | @5° | @10° | @20° | | |
| ContextDesc | NN + ratio test | 20.16 | 31.65 | 44.05 | 56.2 | 3.3 |
| SIFT | NN + ratio test | 15.19 | 24.72 | 35.30 | 43.4 | 1.7 |
| | NN + NG-RANSAC | 15.61 | 25.28 | 35.87 | 64.4 | 1.9 |
| | NN + OANet | 17.87 | 27.85 | 39.43 | 53.2 | 3.5 |
| | DMEM | 23.03 | 36.51 | 50.07 | 74.0 | 7.3 |
| SuperPoint | NN + mutual | 9.80 | 18.99 | 30.88 | 22.5 | 4.9 |
| | NN + GMS | 13.96 | 24.58 | 36.53 | 47.1 | 4.7 |
| | NN + OANet | 21.03 | 34.08 | 46.88 | 52.4 | 8.4 |
| | DMEM | 34.18 | 50.32 | 64.16 | 84.9 | 11.1 |

5.4. Understanding the Deep Middle-End Matcher

Ablation Study: To evaluate our design decisions, we repeated the indoor ScanNet experiments, but this time focusing on different the deep middle-end matcher variants. Table 4 shows Ablation of the deep middle-end matcher on ScanNet with Super-Point local features. that all the deep middle-end matcher blocks are useful and bring substantial performance gains. Differences with respect to the full model are shown. While the optimal matching layer alone improves over the baseline Nearest Neighbor matcher, the GNN ex-plains the majority of the gains brought by the deep middle-end matcher. Both cross-attention and positional encoding are critical for strong gluing, and a deeper net further improves precision.

TABLE 4

| | Matcher | Pose AUC@20° | Match precision | Matching score |
|---|---|---|---|---|
| | NN + mutual | 36.40 | 59.4 | 18.8 |
| DMEM | No Graph Neural Net | 38.56 | 66.0 | 17.2 |
| | No cross-attention | 42.57 | 74.0 | 25.3 |
| | No positional encoding | 47.12 | 75.8 | 26.6 |
| | Smaller (3 layers) | 46.93 | 79.9 | 30.0 |
| | Full (9 layers) | 51.84 | 84.4 | 31.5 |

Figure 7:
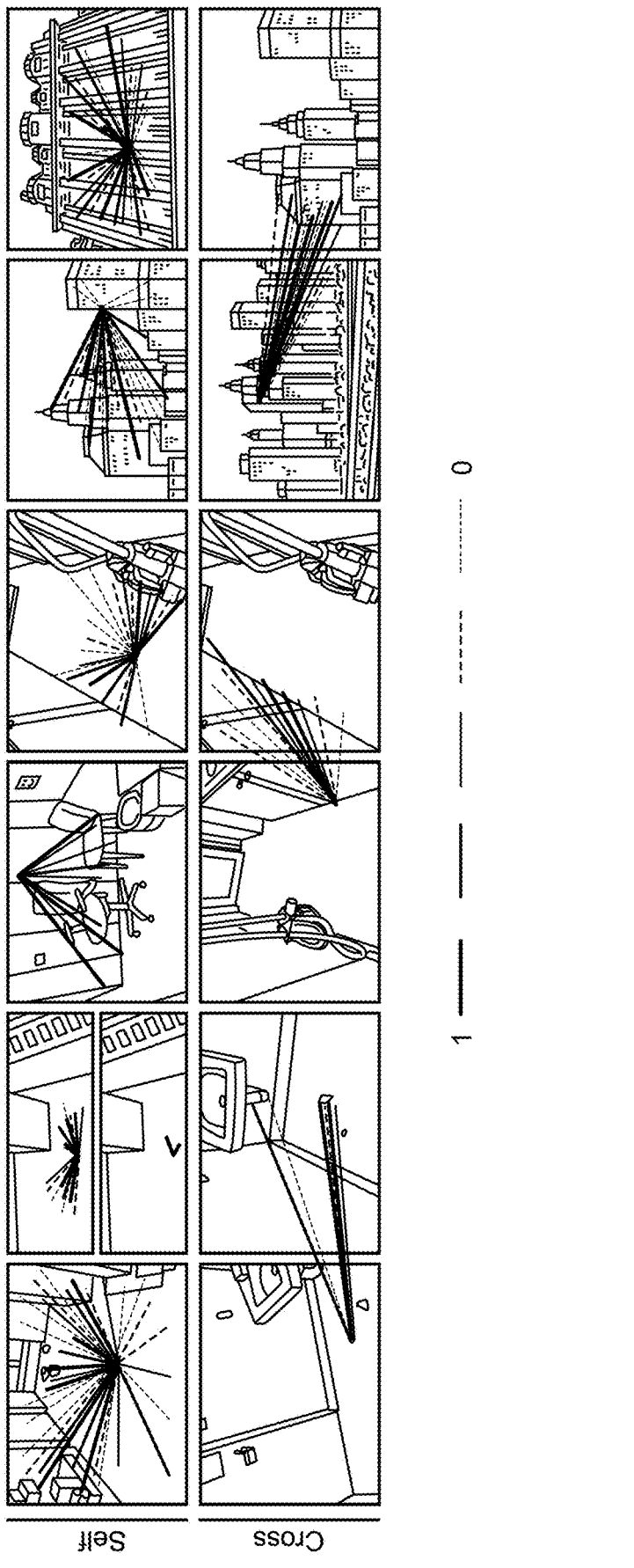
FIG. 7 shows visualizing attention in self-and cross-attention masks at various layers and heads.
Figure 8:
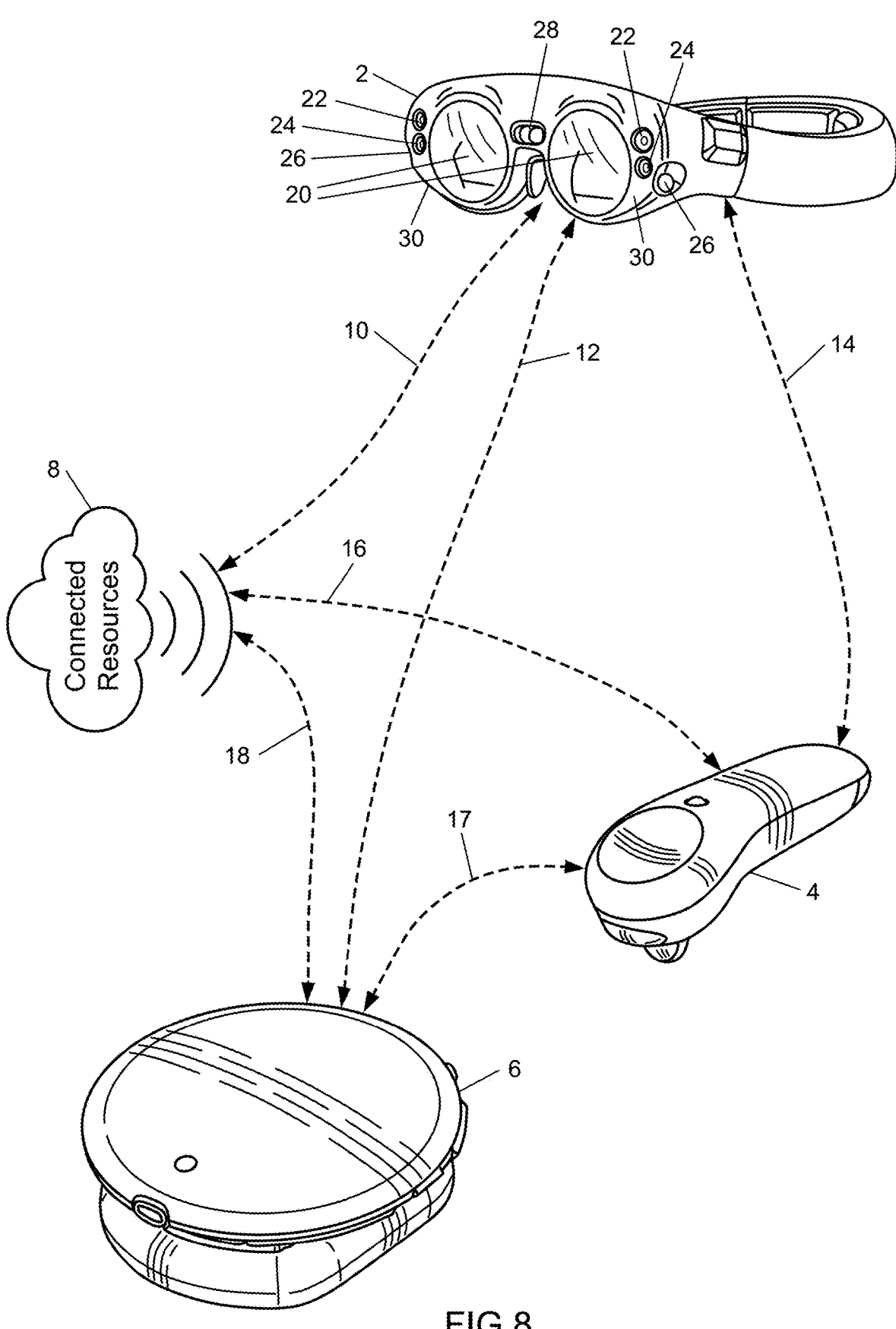
FIG. 8 shows an augmented reality system.

Visualizing Attention: An understanding of the proposed technique would not be complete without an attempt to visualize the deep middle-end matcher's attention patterns throughout matching. The extensive diversity of self-and cross-attention patterns is shown in FIG. 7 and reflects the complexity of the learned behavior. FIG. 7 shows visualizing attention: self-and cross-attention masks $\alpha_{ij}$ at various layers and heads. The deep middle-end matcher learns a diversity of patterns and can focus on global or local context, self-similarities, distinctive features, and match candidates.

6. Conclusion

In this disclosure, we described what we refer to as "the deep middle-end matcher"—an attentional graph neural entirely from real-world data. Our results on 2D-to-2D feature matching show significant improvement over the existing state-of-the-art.

Our description herein makes a strong case for the use of learnable middle-ends in the feature matching pipeline as a modern, deep learning-based, alternative to hand-designed heuristics. Some of our future work will focus on evaluating the deep middle-end matcher inside a complete 3D reconstruction pipeline.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

7. Appendix A—Further Experimental Details

Homography Estimation:

The test set contains 1024 pairs of 640×480 images. Homographies are generated by applying random perspective, scaling, rotation, and translation to the original full-sized images, to avoid bordering artifacts. We evaluate with the 512 top-scoring keypoints detected by SuperPoint with a Non-Maximum Suppression (NMS) radius of 4 pixels. Correspondences are deemed correct if they have a reprojection error lower than 3 pixels. When estimating the homography with RANSAC, we use the OpenCV function findHomography with 3000 iterations and an inlier threshold of 3 pixels.

Indoor Pose Estimation:

The overlap score between two images A and B is the average ratio of pixels in A that are visible in B (and vice versa), after accounting for missing depth values and occlusion (by checking for consistency in the depth using relative errors). We train and evaluate with an overlap range of 0.4 to 0.8. For training, we sample at each epoch 200 pairs per scene, similarly as in [15]. The test set is generated by subsampling the sequences by 15 and subsequently sampling 15 pairs for each of the 300 sequences. We resize all ScanNet images and depth maps to VGA 640×480 . We detect up to 1024 SuperPoint keypoints (using the publicly available trained model with NMS radius of 4) and 2048 SIFT keypoints (using OpenCV's implementation). When computing the precision and matching score, we use an epipolar threshold of 5.10e−4. Poses are computed by first estimating the essential matrix with OpenCV's findEssentialMat and RANSAC with an inlier threshold of 1 pixel divided by the average focal length, followed by recoverPose. In contrast with previous works [28, 59, 6], we compute a more accurate AUC using explicit integration rather than coarse histograms.

Outdoor Pose Estimation:

For training on Megadepth, the overlap score is the ratio of triangulated keypoints that are visible in the two images, as in [15]. We sample pairs with an overlap score in [0.1, 0.7] at each epoch. For the evaluation on the PhotoTourism dataset, we use all 11 scenes and the overlap score computed by Ono [30], with a selection range of [0.1,0.4]. Images are resized so that their longest edge is smaller than 1600 pixels. We detect 2048 keypoints for both SIFT and SuperPoint (with an NMS radius of 3). Other evaluation parameters are identical to the ones used in the indoor evaluation.

Training of the Deep Middle-End Matcher:

For training on homography/indoor/outdoor data, we use the Adam optimizer with an initial constant learning rate of 10e−4 for the first 200 k/100 k/50 k iterations, followed by an exponential decay of 0.999998/0.999992/0.999992 until iteration 900 k. When using SuperPoint features, we employ batches with 32/64/16 image pairs and a fixed number of 512/400/1024 keypoints per image. When using SIFT features we use 1024 keypoints and 24 pairs. Because of the limited number of training scenes, the outdoor model is initialized with the homography model. Prior to the keypoint encoding, keypoints are normalized by the largest edge of the image.

Ground truth correspondences M and unmatched sets I and J are generated by first computing the M×N re-projection matrix between all detected keypoints using the ground truth homography or pose and depth map. Correspondences are cells that have a reprojection error that is a minimum along both rows and columns, and that is lower than a given threshold: 3, 5, and 3 pixels for homographies, indoor, and outdoor matching respectively. For homographies, unmatched keypoints are simply the ones that do not appear in M. For indoor and outdoor matching, because of errors in the depth and the pose, unmatched keypoints must additionally have a minimum reprojection error larger than 15 and 5 pixels, respectively. This allows to ignore labels for keypoints whose correspondences are ambiguous, while still providing some supervision through the Sinkhorn normalization.

8. REFERENCES

Each of the following references is incorporated by reference herein in its entirety, and referenced in the above description:

[1] Phototourism Challenge, CVPR 2019 Image Matching Workshop. https://imagematching-workshop.github.io. Accessed Nov. 8, 2019. 7

[2] Relja Arandjelović and Andrew Zisserman. Three things everyone should know to improve object retrieval. In *CVPR*, 2012. 6

[3] Peter W Battaglia, Jessica B Hamrick, Victor Bapst, Alvaro Sanchez-Gonzalez, Vinicius Zambaldi, Mateusz Malinowski, Andrea Tacchetti, David Raposo, Adam Santoro, Ryan Faulkner, et al. Relational inductive biases, deep learning, and graph networks. *arXiv:*1806.01261, 2018. 2, 3

[4] Alexander C Berg, Tamara L Berg, and Jitendra Malik. Shape matching and object recognition using low distortion correspondences. In *CVPR*, 2005. 2

[5] JiaWang Bian, Wen-Yan Lin, Yasuyuki Matsushita, Sai-Kit Yeung, Tan-Dat Nguyen, and Ming-Ming Cheng. GMS: Grid-based motion statistics for fast, ultra-robust feature correspondence. In *CVPR*, 2017. 2, 6

[6] Eric Brachmann and Carsten Rother. Neural-Guided RANSAC: Learning Where to Sample Model Hypotheses. In *ICCV*, 2019. 2, 6

[7] Tibério S Caetano, Julian J McAuley, Li Cheng, Quoc V Le, and Alex J Smola. Learning graph matching. *IEEE TPAMI*, 31(6):1048-1058, 2009. 2

[8] Jan Cech, Jiri Matas, and Michal Perdoch. Efficient sequential correspondence selection by cosegmentation. *IEEE TPAMI*, 32(9):1568-1581, 2010. 2

[9] Marco Cuturi. Sinkhorn distances: Lightspeed computation of optimal transport. In *NIPS*, 2013. 1, 2, 4

[10] Angela Dai, Angel X Chang, Manolis Savva, Maciej Halber, Thomas Funkhouser, and Matthias Nießner. Scannet: Richly-annotated 3d reconstructions of indoor scenes. In *CVPR*, 2017. 6

[11] Haowen Deng, Tolga Birdal, and Slobodan Ilic. Ppfnet: Global context aware local features for robust 3d point matching. In *CVPR*, 2018. 2

[12] Daniel DeTone, Tomasz Malisiewicz, and Andrew Rabinovich. Deep image homography estimation. In *RSS Work-shop: Limits and Potentials of Deep Learning in Robotics*, 2016. 5

[13] Daniel DeTone, Tomasz Malisiewicz, and Andrew Rabinovich. Self-improving visual odometry. *arXiv:* 1812.03245, 2018. 6

[14] Daniel DeTone, Tomasz Malisiewicz, and Andrew Rabinovich. SuperPoint: Self-supervised interest point detection and description. In *CVPR Workshop on Deep Learning for Visual SLAM*, 2018. 2, 4, 5, 6

[15] Mihai Dusmanu, Ignacio Rocco, Tomas Pajdla, Marc Pollefeys, Josef Sivic, Akihiko Torii, and Torsten Sattler. D2-net: A trainable cnn for joint detection and description of local features. In *CVPR*, 2019. 2, 6

[16] Patrick Ebel, Anastasiia Mishchuk, Kwang Moo Yi, Pascal Fua, and Eduard Trulls. Beyond cartesian representations for local descriptors. In *ICCV*, 2019. 2

[17] Martin A Fischler and Robert C Bolles. Random sample consensus: a paradigm for model fitting with applications to image analysis and automated cartography. *Communications of the ACM*, 24(6):381-395, 1981. 2

[18] Justin Gilmer, Samuel S Schoenholz, Patrick F Riley, Oriol Vinyals, and George E Dahl. Neural message passing for quantum chemistry. In *ICML*, 2017. 2, 3

[19] Richard Hartley and Andrew Zisserman. *Multiple view geometry in computer vision*. Cambridge university press, 2003. 6

[20] Juho Lee, Yoonho Lee, Jungtaek Kim, Adam Kosiorek, Seungjin Choi, and Yee Whye Teh. Set transformer: A frame-work for attention-based permutation-invariant neural networks. In *ICML*, 2019. 2

[21] Marius Leordeanu and Martial Hebert. A spectral technique for correspondence problems using pairwise constraints. In *ICCV*, 2005. 2

[22] Yujia Li, Chenjie Gu, Thomas Dullien, Oriol Vinyals, and Pushmeet Kohli. Graph matching networks for learning the similarity of graph structured objects. In *ICML*, 2019. 2

[23] Zhengqi Li and Noah Snavely. Megadepth: Learning single-view depth prediction from internet photos. In *CVPR*, 2018. 7

[24] Eliane Maria Loiola, Nair Maria Maia de Abreu, Paulo Oswaldo Boaventura-Netto, Peter Hahn, and Tania Querido. A survey for the quadratic assignment problem. *European journal of operational research*, 176(2):657-690, 2007. 2

[25] David G Lowe. Distinctive image features from scale-invariant keypoints. *International Journal of Computer Vision*, 60(2):91-110, 2004. 2, 6

[26] Zixin Luo, Tianwei Shen, Lei Zhou, Jiahui Zhang, Yao Yao, Shiwei Li, Tian Fang, and Long Quan. Contextdesc: Local descriptor augmentation with cross-modality context. In *CVPR*, 2019. 2, 5, 6

[27] Kwang Moo Yi, Eduard Trulls, Yuki Ono, Vincent Lepetit, Mathieu Salzmann, and Pascal Fua. Learning to find good correspondences. In *CVPR*, 2018. 2, 5, 6

[28] James Munkres. Algorithms for the assignment and transportation problems. *Journal of the society for industrial and applied mathematics*, 5(1):32-38, 1957. 4

[29] Yuki Ono, Eduard Trulls, Pascal Fua, and Kwang Moo Yi. LF-Net: Learning local features from images. In *NeurIPS*, 2018. 2, 6, 7

[30] Adam Paszke, Sam Gross, Soumith Chintala, Gregory Chanan, Edward Yang, Zachary DeVito, Zeming Lin, Al-ban Desmaison, Luca Antiga, and Adam Lerer. Automatic differentiation in pytorch. In *NIPS Workshops*, 2017. 5

[31] Gabriel Peyré, Marco Cuturi, et al. Computational optimal transport. *Foundations and Trends in Machine Learning*, 11(5-6):355-607, 2019. 1, 2, 4

[32] Charles R Qi, Hao Su, Kaichun Mo, and Leonidas J Guibas. Pointnet: Deep learning on point sets for 3d classification and segmentation. In *CVPR*, 2017. 2

[33] Charles Ruizhongtai Qi, Li Yi, Hao Su, and Leonidas J Guibas. Pointnet++: Deep hierarchical feature learning on point sets in a metric space. In *NIPS*, 2017. 2

[34] Filip Radenović, Ahmet Iscen, Giorgos Tolias, Yannis Avrithis, and Ondřej Chum. Revisiting oxford and paris: Large-scale image retrieval benchmarking. In *CVPR*, 2018. 5, 9

[35] Rahul Raguram, Jan-Michael Frahm, and Marc Pollefeys. A comparative analysis of ransac techniques leading to adaptive real-time random sample consensus. In *ECCV*, 2008. 2

[36] René Ranftl and Vladlen Koltun. Deep fundamental matrix estimation. In *ECCV*, 2018. 2, 5

[37] Jerome Revaud, Philippe Weinzaepfel, Ceésar DeSouza, Noe Pion, Gabriela Csurka, Yohann Cabon, and Martin Humenberger. R2D2: Repeatable and reliable detector and descriptor. In *NeurIPS*, 2019. 2, 5

[38] Ignacio Rocco, Mircea Cimpoi, Relja Arandjelović, Akihiko Torii, Tomas Pajdla, and Josef Sivic. Neighbourhood consensus networks. In *NeurIPS*, 2018. 2

[39] Ethan Rublee, Vincent Rabaud, Kurt Konolige, and Gary R Bradski. Orb: An efficient alternative to sift or surf. In *ICCV*, 2011. 6

[40] Torsten Sattler, Bastian Leibe, and Leif Kobbelt. Scramsac: Improving ransac's efficiency with a spatial consistency fil-ter. In *ICCV*, 2009. 2

[41] Johannes Lutz Schonberger and Jan-Michael Frahm. Structure-from-motion revisited. In *CVPR*, 2016. 7

[42] Johannes Lutz Schonberger, Enliang Zheng, Marc Pollefeys, and Jan-Michael Frahm. Pixelwise view selection for un-structured multi-view stereo. In *ECCV*, 2016. 7

[43] Richard Sinkhorn and Paul Knopp. Concerning non-negative matrices and doubly stochastic matrices. *Pacific Journal of Mathematics*, 1967. 2, 4

[44] Bart Thomee, David A Shamma, Gerald Friedland, Benjamin Elizalde, Karl Ni, Douglas Poland, Damian Borth, and Li-Jia Li. Yfcc100m: The new data in multimedia research. *Communications of the ACM*, 59(2):64-73, 2016. 7

[45] Lorenzo Torresani, Vladimir Kolmogorov, and Carsten Rother. Feature correspondence via graph matching: Models and global optimization. In *ECCV*, 2008. 2

[46] Tinne Tuytelaars and Luc J Van Gool. Wide baseline stereo matching based on local, affinely invariant regions. In *BMVC*, 2000. 2

[47] Dmitry Ulyanov, Andrea Vedaldi, and Victor Lempitsky. Instance normalization: The missing ingredient for fast stylization. *arXiv:1607.08022*, 2016. 2, 5

[48] Ashish Vaswani, Noam Shazeer, Niki Parmar, Jakob Uszko-reit, Llion Jones, Aidan N Gomez, Łukasz Kaiser, and Illia Polosukhin. Attention is all you need. In *NIPS*, 2017. 1, 2, 3, 4, 5

[49] Petar Veličkovič, Guillem Cucurull, Arantxa Casanova, Adriana Romero, Pietro LiŠò, and Yoshua Bengio. Graph attention networks. In *ICLR*, 2018. 2

[50] Cédric Villani. *Optimaltransport:oldandnew*, volume338. Springer Science & Business Media, 2008. 1, 2

[51] Xiaolong Wang, Ross Girshick, Abhinav Gupta, and Kaiming He. Non-local neural networks. In *CVPR*, 2018. 2

[52] Yue Wang and Justin M Solomon. Deep Closest Point: Learning representations for point cloud registration. In *ICCV*, 2019. 2

[53] Yue Wang, Yongbin Sun, Ziwei Liu, Sanjay E. Sarma, Michael M. Bronstein, and Justin M. Solomon. Dynamic Graph CNN for learning on point clouds. *ACM Transactions on Graphics*, 2019. 2

[54] Kwang Moo Yi, Eduard Trulls, Vincent Lepetit, and Pascal Fua. Lift: Learned invariant feature transform. In *ECCV*, 2016. 2, 6

[55] Manzil Zaheer, Satwik Kottur, Siamak Ravanbakhsh, Barnabas Poczos, Ruslan R Salakhutdinov, and Alexander J Smola. Deep sets. In *NIPS*, 2017. 2

[56] Jiahui Zhang, Dawei Sun, Zixin Luo, Anbang Yao, Lei Zhou, Tianwei Shen, Yurong Chen, Long Quan, and Hon-gen Liao. Learning two-view correspondences and geometry using order-aware network. In *ICCV*, 2019. 2, 5, 6

[57] Li Zhang, Xiangtai Li, Anurag Arnab, Kuiyuan Yang, Yunhai Tong, and Philip HS Torr. Dual graph convolutional net-work for semantic segmentation. In *BMVC*, 2019.

What is claimed:

1. A computer system comprising:
a computer-readable medium;
a processor connected to the computer-readable medium; and
a set of instructions on the computer-readable medium, including:
a deep middle-end matcher architecture that is executable by the processor and includes:
an attentional graph neural network that has:
a keypoint encoder to map keypoint positions p and their visual descriptors d into a single vector; and
at least one layer that, based on the vector, creates representations f, wherein the at least one layer includes alternating self-attention and cross-attention layers that, based on the vector, repeated L times to create representations f; and
an optimal matching layer that creates an M by N score matrix from the representations f and finds an optimal partial assignment based on the M by N score matrix, where:
p are keypoint positions,
f are representations,
d are descriptors,
L are a plurality of times,
M by N is a score matrix with a length M and a width N.

2. The computer system of claim 1, wherein, in the keypoint encoder, an initial representation $^{(0)}x_i$ for each keypoint combines visual appearance and location, with the respective keypoint position embedded into a high-dimensional vector with a Multilayer Perceptron as follows:

$$^{(0)}x_i = d_i + MLP(p_i).$$

where:
i are keypoints,
$^{(0)}x_i$ is an initial representation for the keypoints,
$d_i$ are descriptors for the keypoints,
$p_i$ are keypoint positions for the keypoints, and
MLP is a Multilayer Perceptron for the keypoint positions.

3. The computer system of claim 2, wherein the keypoint encoder allows the attentional graph neural network to reason about appearance and position jointly.

4. The computer system of claim 1, wherein, in the keypoint encoder includes a multiplex graph neural network having a single complete graph with nodes that are the keypoints of two images.

5. The computer system of claim 4, wherein the graph is a multiplex graph that has two types of undirected edges, namely intra-image edges that connect keypoints i to all other keypoints within the same image and inter-image edges that connect keypoints i to all keypoints in the other image and uses a message passing formulation to propagate information along both types of edges, such that the resulting multiplex graph neural network starts with a high-dimensional state for each node and computes at each layer an updated representation by simultaneously aggregating messages across all given edges for all nodes
where:
$E_{self}$ are self edges, and
$E_{cross}$ are cross edges.

6. The computer system of claim 5, wherein if $^{(l)}x^A_i$ is the intermediate representation for keypoint i in image A at layer 1, the message $m_{E \to i}$ is the result of the aggregation from all keypoints {j:(i, j)∈E}, where E∈{$E_{self}$, $E_{cross}$}, and a residual message passing update for all i in A is:

$$^{(\ell+1)}x_i^A = {}^{(\ell)}x_i^A + MLP\big(\big[{}^{(\ell)}x_i^A \| m_{\mathcal{E}\to i}\big]\big),$$

where:
[·||·] denotes concatenation,
i are keypoints,
$E_{self}$ are self edges,
$E_{cross}$ are cross edges,
$m_E$ is a message, and
MLP is a Multilayer Perceptron for the keypoint positions.

7. The computer system of claim 6, wherein a fixed number of layers with different parameters are chained and alternatively aggregate along the self and cross edges such that, starting from l=1, E=$E_{self}$ if l is odd and E=$E_{cross}$ if l is even.

8. The computer system of claim 6, wherein the alternating self- and cross-attention layers are computed with an attention mechanism computes the message $m_{E\to i}$ and performs the aggregation, wherein the self edges are based on self-attention and the cross edges are based on cross-attention, wherein, for a representation of i, a query $q_i$, retrieves values $v_j$ of some elements based on their attributes, the keys $k_j$, and the message is computed as weighted average of the values:

$$m_{\mathcal{E}\to i} = \sum_{j:(i,j)\in\varepsilon} \alpha_{ij} v_j,$$

where:
i are keypoints,
$m_E$ is a message,
$q_i$ are queries for the keypoints,
$v_i$ are retrieves values for the keypoints,
$k_i$ are keys for the keypoints,
j is a step variable in a summation formula,
$\alpha_{ij}$ is a Softmax function, and
MLP is a Multilayer Perceptron for the keypoint positions.

9. The computer system of claim 8, wherein an attention mask $\alpha_{ij}$ is the Softmax over the key-query similarities:

$$\alpha_{ij} = \text{Softmax}_j\,(q_i^\top k_j).$$

10. The computer system of claim 1, wherein final matching descriptors of the alternating self-and cross-attention layers are linear projections:

$$f_i^A = W^{(L)}x_i^A + b \quad \forall\, i \in \mathcal{A},$$

where:
W represents a slope of the linear projection,
B represents a constant in the linear projection, and
A is an image.

11. The computer system of claim 1, wherein the optimal matching layer expresses a pairwise score for a set as the similarity of matching descriptors:

$$S_{i,j} = \,<f_i^A, f_j^B>\, \forall\, (i, j) \in \mathcal{A}\times\mathcal{B},$$

where:
$S_{i,j}$ is a pairwise score,
<·, ·> is the inner product,
A is an image, and
B is an image.

12. The computer system of claim 11, wherein the optimal matching layer, for occlusion and visibility suppresses occluded keypoints and augments each set of keypoints with a dustbin score so that unmatched keypoints are explicitly assigned to dustbin scores.

13. The computer system of claim 12, wherein the score S is augmented to $\bar S$ by appending a new row and column, the point-to-bin and bin-to-bin scores, filled with a single learnable parameter:

$$\bar S_{i,N+1} = \bar S_{M+1,j} = \bar S_{M+1,N+1} = \alpha \in \mathbb{R}.$$

where:
N+1 and M+1 represent augmentations.

14. The computer system of claim 12, wherein the optimal matching layer finds the optimal partial assignment based on the M by N score matrix using the Sinkhorn algorithm for T iterations.

15. The computer system of claim 14, wherein after T iterations, the optimal matching layer drops the dustbin scores and recovers P=$\bar P_{1:M,1:N}$, where $$P1_N \le 1_M \text{ and } P^\top 1_M \le 1_N.$$

is the original assignment and $$\bar P1_{N+1} = a \text{ and } \bar P^\top 1_{M+1} = b.$$

is the assignment with the dustbin scores augmented.

16. A computer-implemented method that includes:
creating, with an attentional graph neural network, a representation by mapping, with a keypoint encoder of the attentional graph neural network keypoint positions p and their visual descriptors d into a single vector;
creating, with an optimal matching layer, a score from the representation by executing, with at least one layer of the attentional graph neural network, based on the vector, representations f, including executing with alternating self- and cross-attention layers of the attentional graph neural network, based on the vector, for L repeated times, to create representations f; and
finding, with the optimal matching layer, an M by N score matrix from the representations f and finds an optimal partial assignment based on the M by N score matrix,
where:
p are keypoint positions,
f are representations,
L are a plurality of times,
M by N is a score matrix with a length M and a width N.

* * * * *